(12) United States Patent
Ikemizu

(10) Patent No.: US 9,669,336 B2
(45) Date of Patent: Jun. 6, 2017

(54) WATER PURIFIER

(75) Inventor: Mugihei Ikemizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 528 days.

(21) Appl. No.: 14/131,864

(22) PCT Filed: May 29, 2012

(86) PCT No.: PCT/JP2012/063701
§ 371 (c)(1),
(2), (4) Date: Jan. 9, 2014

(87) PCT Pub. No.: WO2013/011743
PCT Pub. Date: Jan. 24, 2013

(65) Prior Publication Data
US 2014/0209525 A1    Jul. 31, 2014

(30) Foreign Application Priority Data
Jul. 20, 2011  (JP) ................. 2011-159031

(51) Int. Cl.
| | | |
|---|---|---|
| B01D 21/30 | (2006.01) |
| B01D 29/90 | (2006.01) |
| C02F 1/00 | (2006.01) |
| C02F 9/00 | (2006.01) |
| C02F 1/28 | (2006.01) |
| C02F 1/44 | (2006.01) |
| B01D 61/02 | (2006.01) |
| B01D 61/14 | (2006.01) |

(52) U.S. Cl.
CPC ............ *B01D 29/90* (2013.01); *C02F 1/008* (2013.01); *C02F 9/005* (2013.01); *B01D 61/025* (2013.01); *B01D 61/027* (2013.01); *B01D 61/145* (2013.01); *B01D 61/147* (2013.01); *C02F 1/283* (2013.01); *C02F 1/441* (2013.01); *C02F 1/444* (2013.01); *C02F 2201/005* (2013.01); *C02F 2303/16* (2013.01)

(58) Field of Classification Search
None
See application file for complete search history.

(56) References Cited

U.S. PATENT DOCUMENTS

| | | | | |
|---|---|---|---|---|
| 3,675,775 A | * | 7/1972 | Obidniak | ............... B01D 35/12 |
| | | | | 210/138 |
| 4,807,664 A | * | 2/1989 | Wilson | ................. A01G 25/165 |
| | | | | 137/624.11 |
| 5,133,385 A | | 7/1992 | Kawakami | |

FOREIGN PATENT DOCUMENTS

| | | |
|---|---|---|
| JP | 8-84989 A | 4/1996 |
| JP | 2523223 B2 | 5/1996 |
| JP | 2008-279372 A | 11/2008 |

* cited by examiner

*Primary Examiner* — Richard Gurtowski
(74) *Attorney, Agent, or Firm* — Birch, Stewart, Kolasch & Birch, LLP

(57) ABSTRACT

In a water purifier, a flow system includes a first channel in which liquid is filtrated in at least one of a first filter tank and a second filter tank, a second channel in which the liquid is filtrated in the second filter tank and the first filter tank is washed, and a third channel in which the liquid is filtrated in the first filter tank and the second filter tank is washed. A switching lever actuates valve mechanisms to perform switching among the first, second, and third channels such that the channels are selected cyclically in order of the first channel, the second channel, the first channel, the third channel and the first channel. The valve mechanisms work with operation of the switching lever.

8 Claims, 15 Drawing Sheets

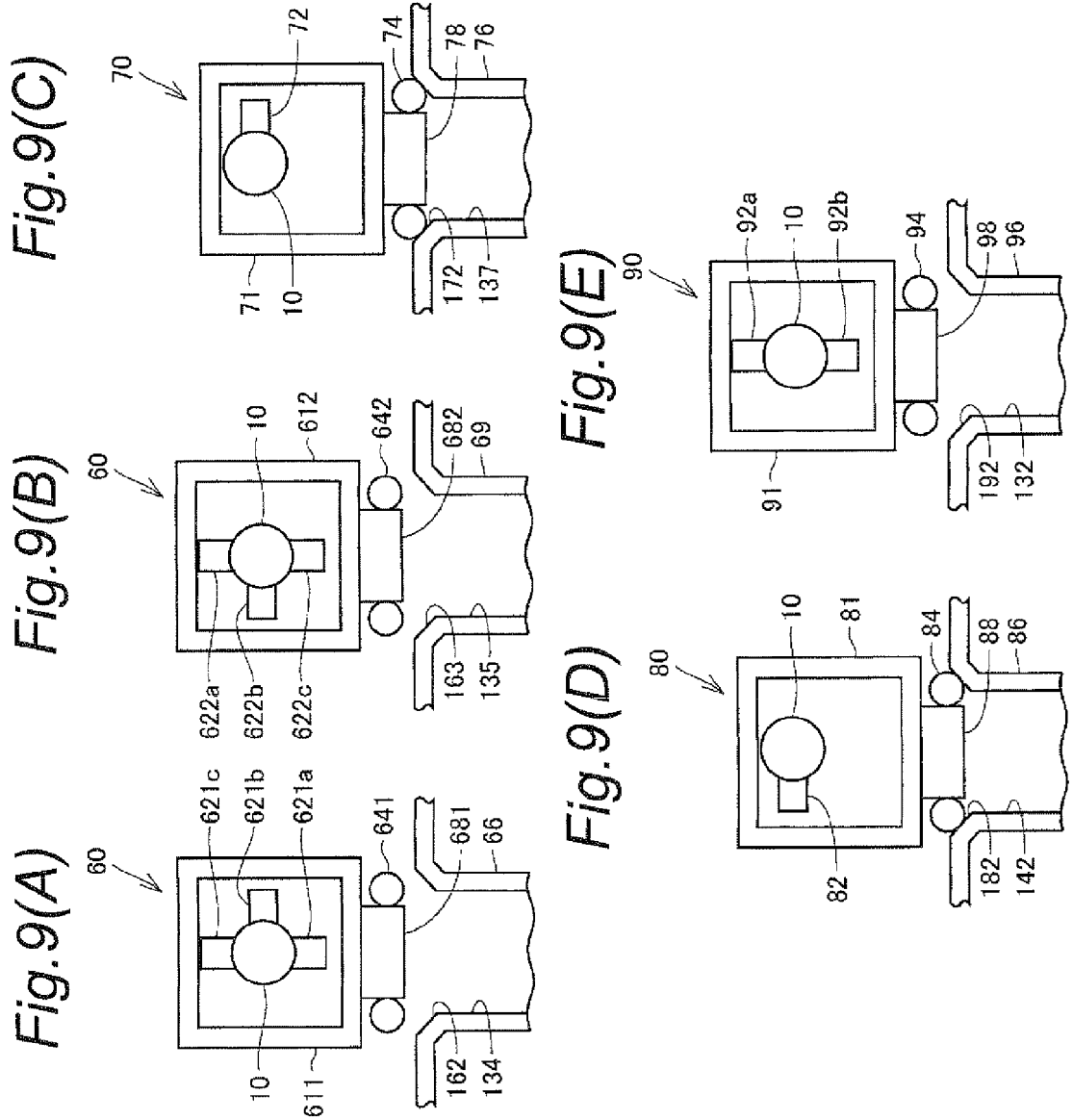

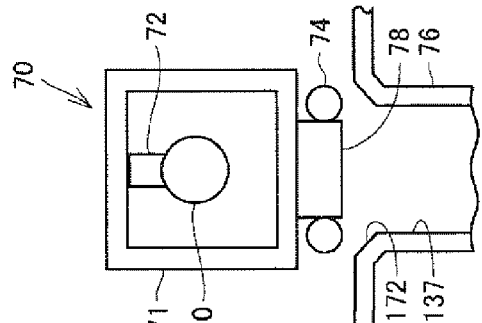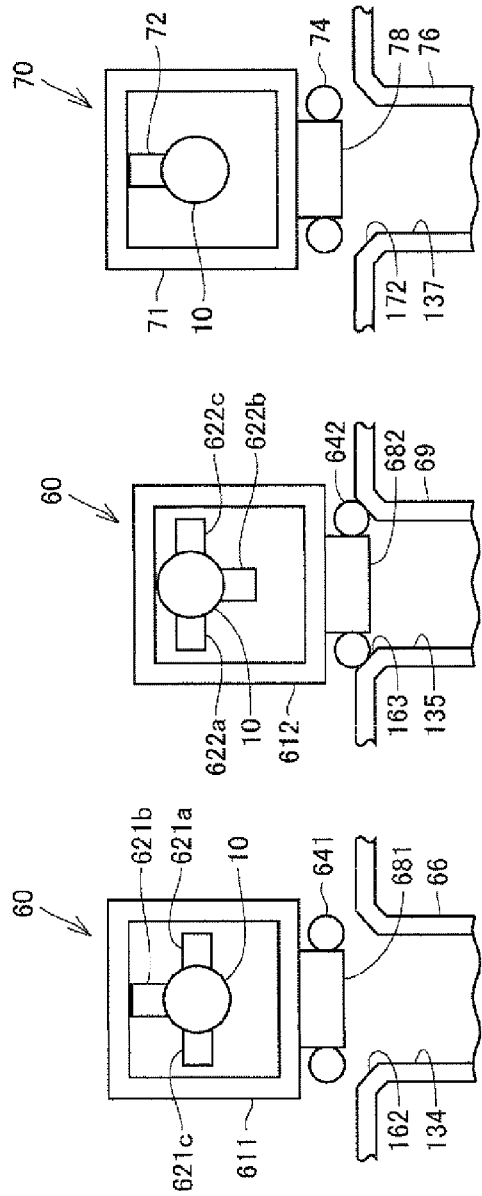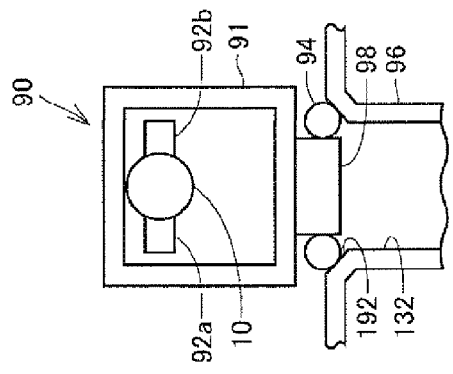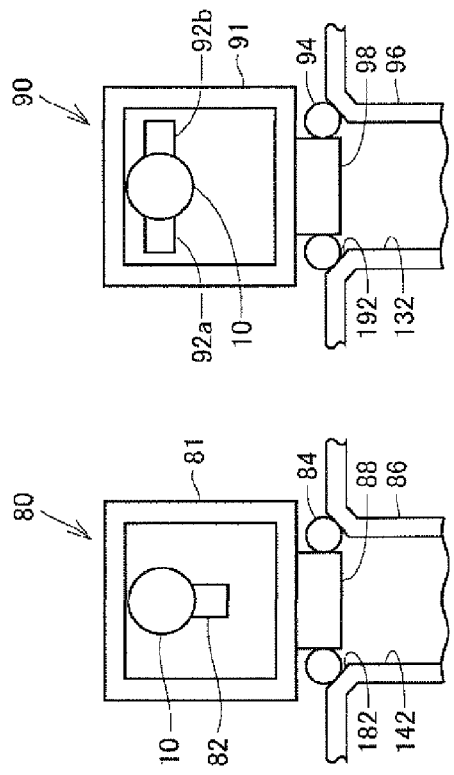

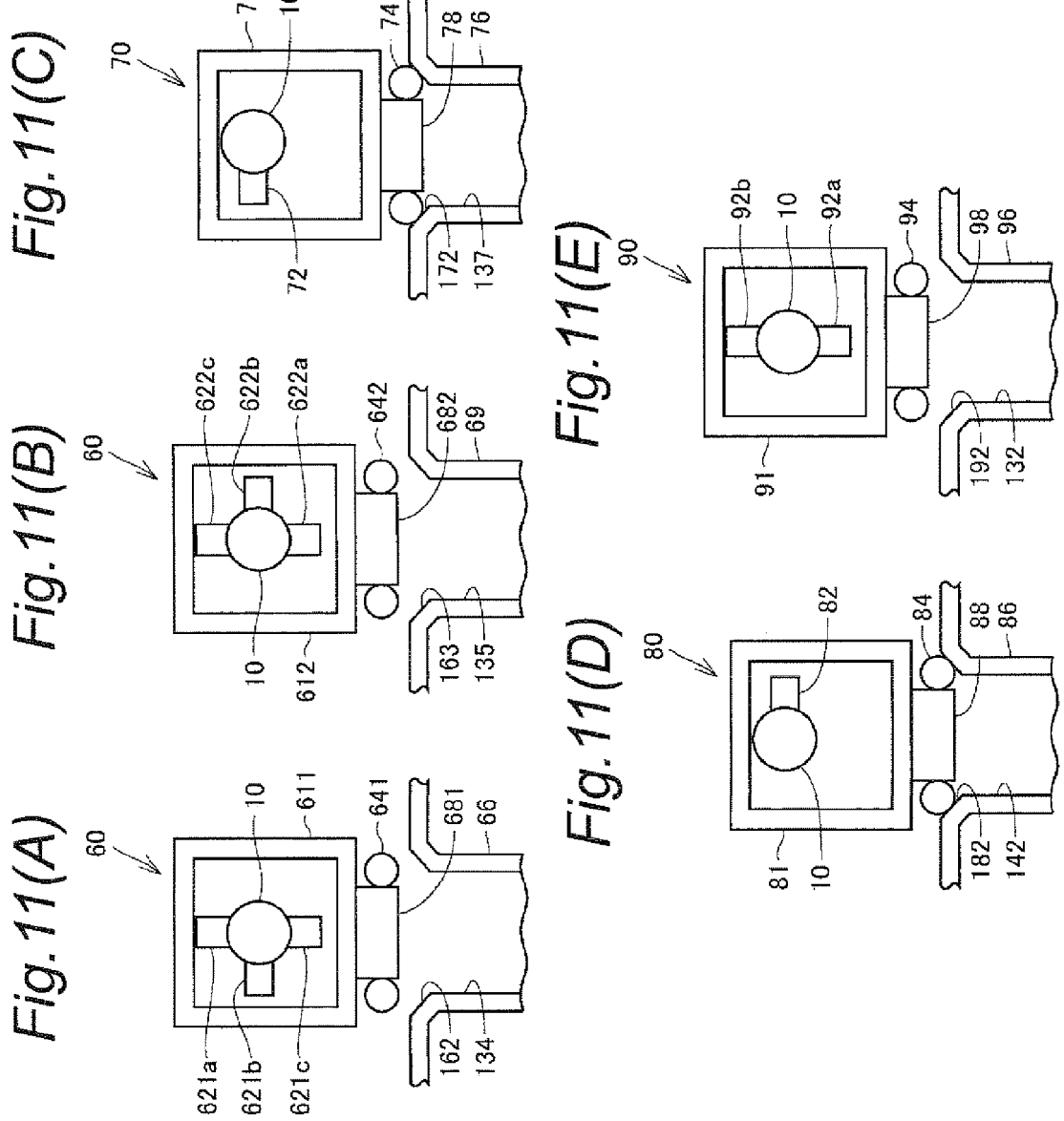

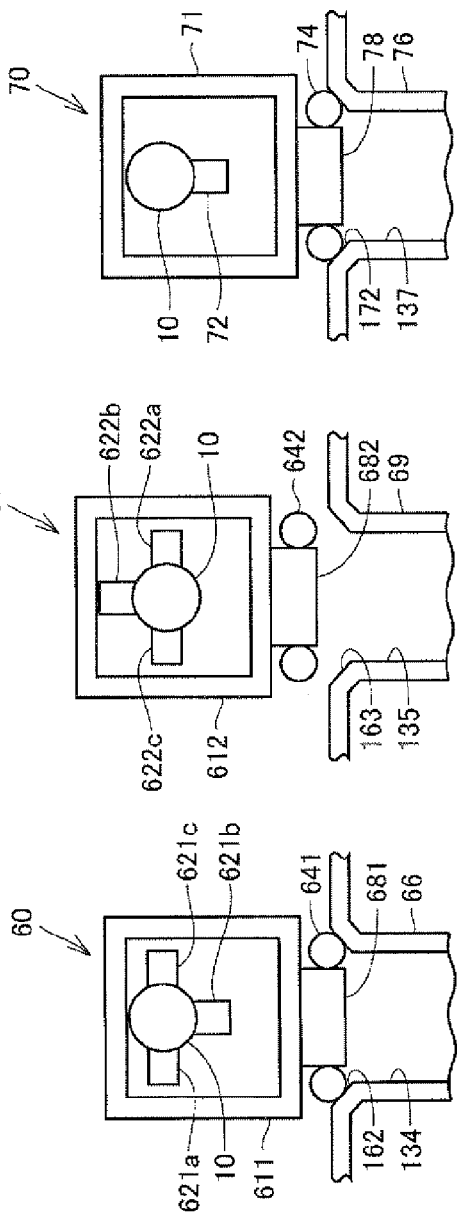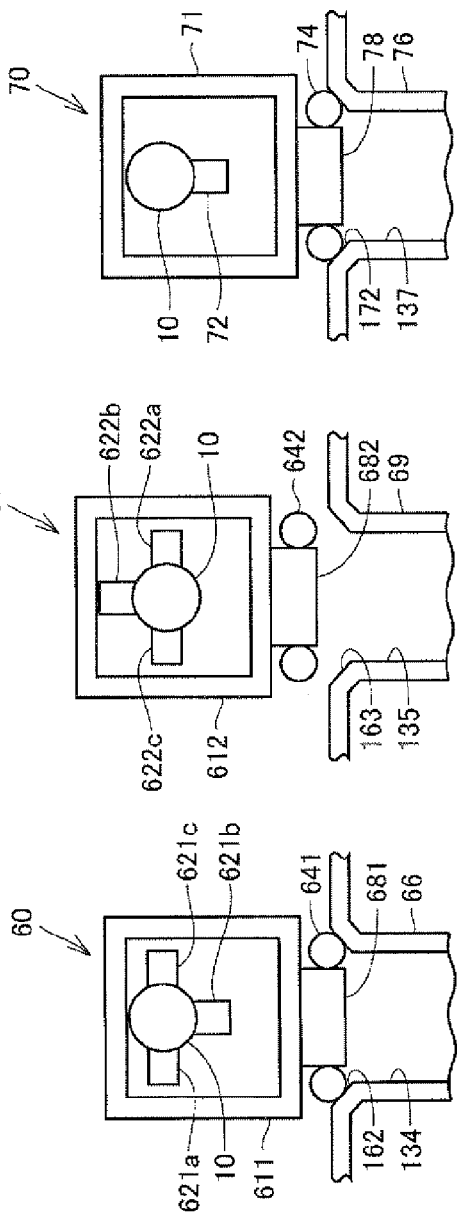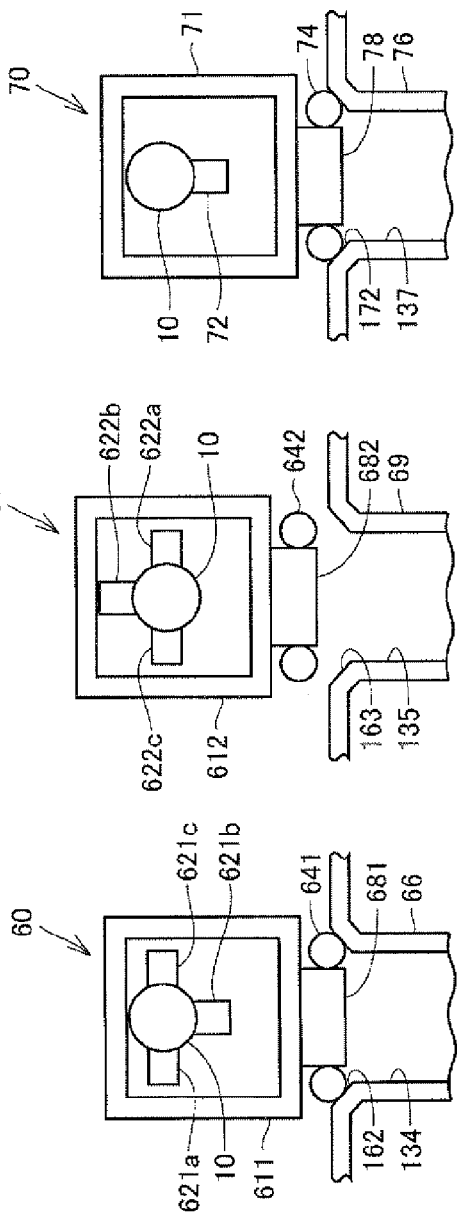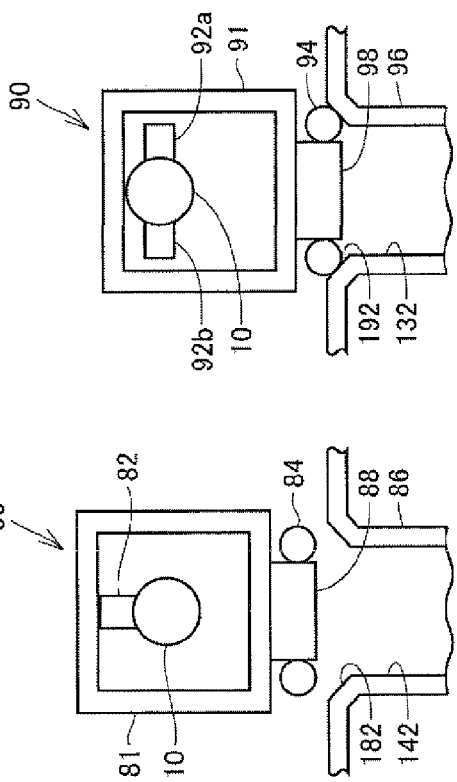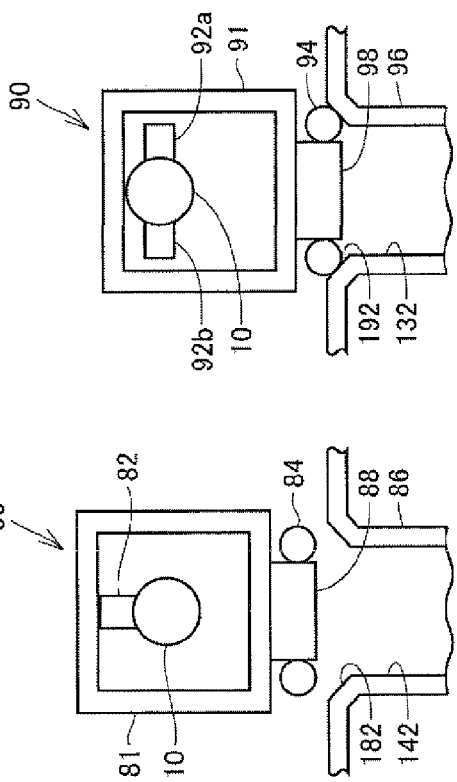

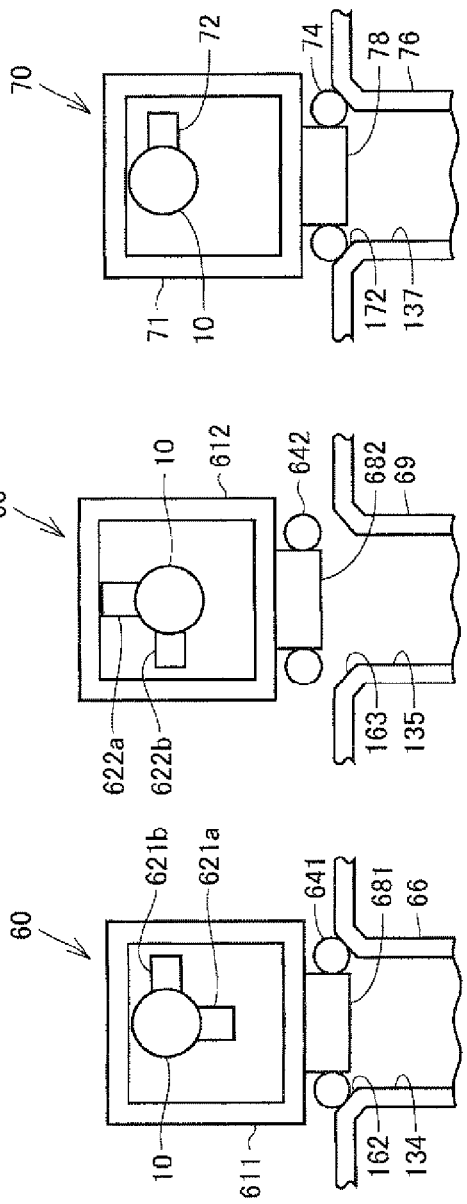

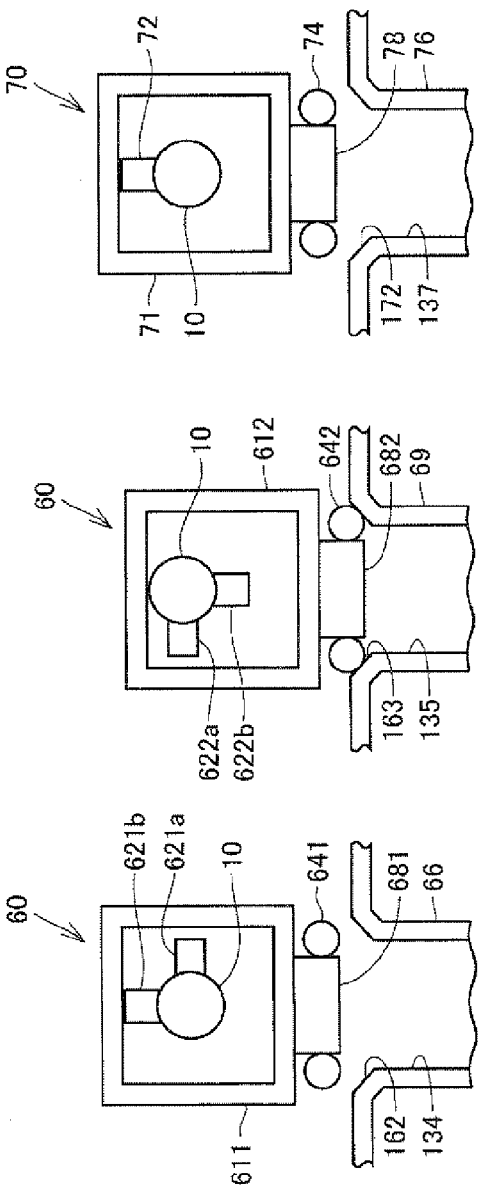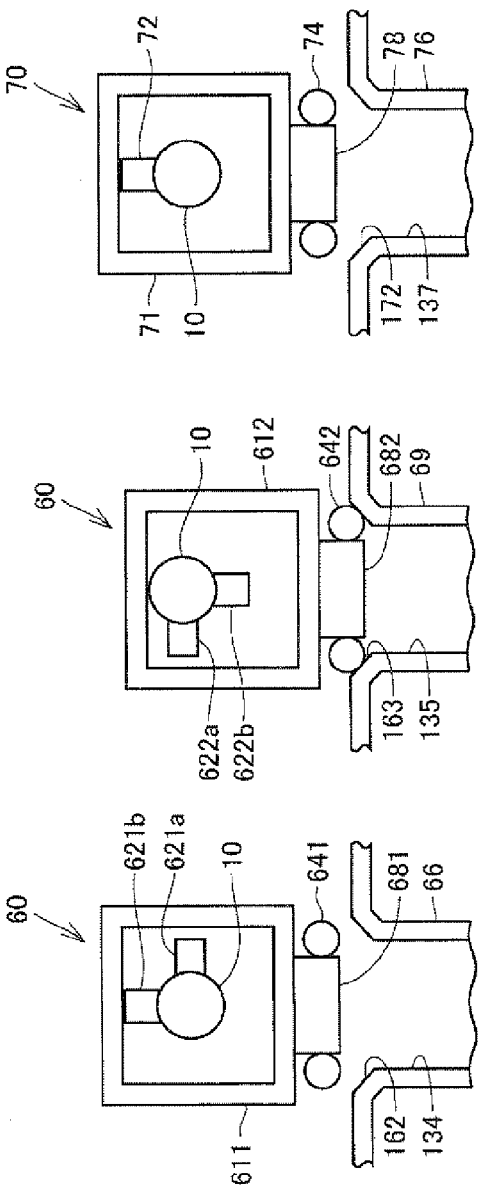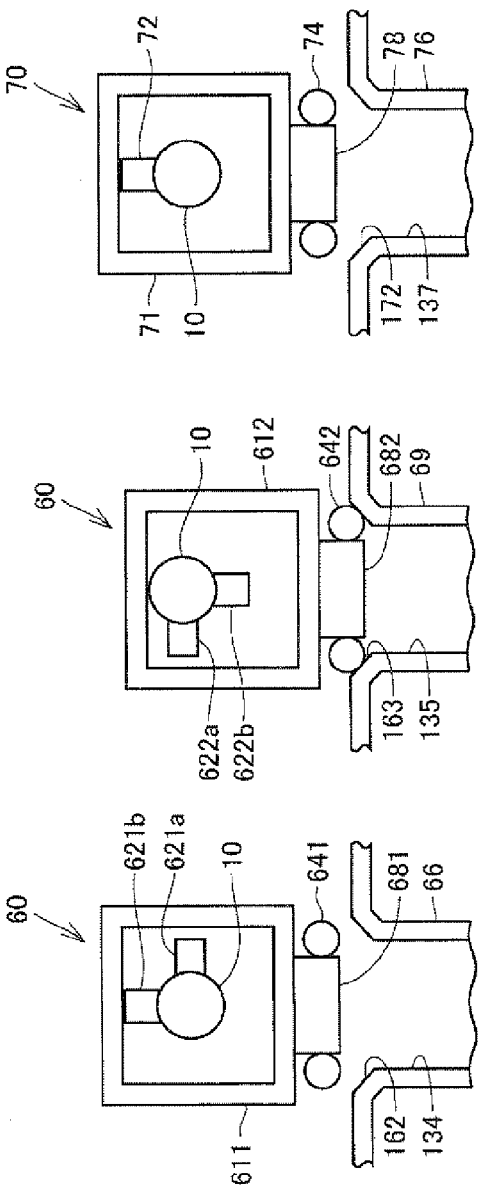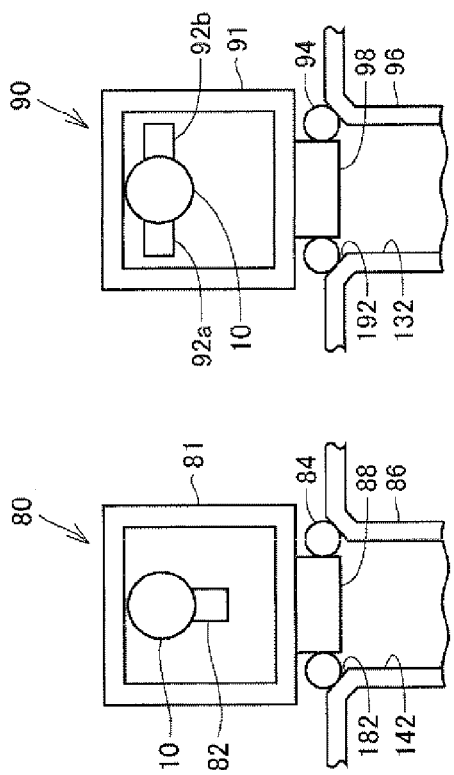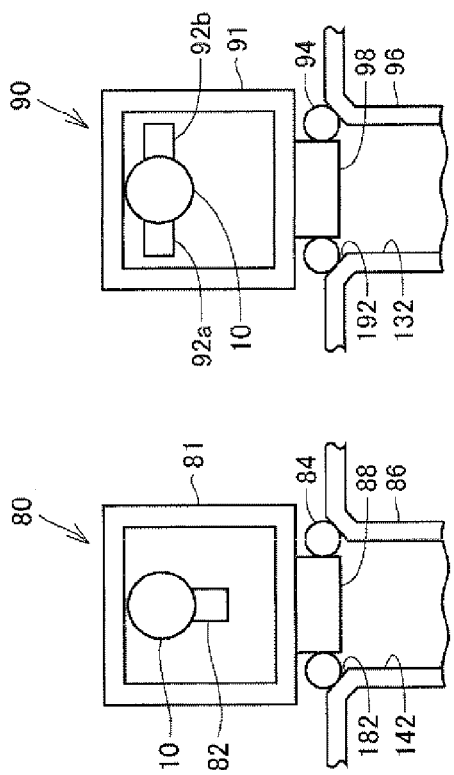

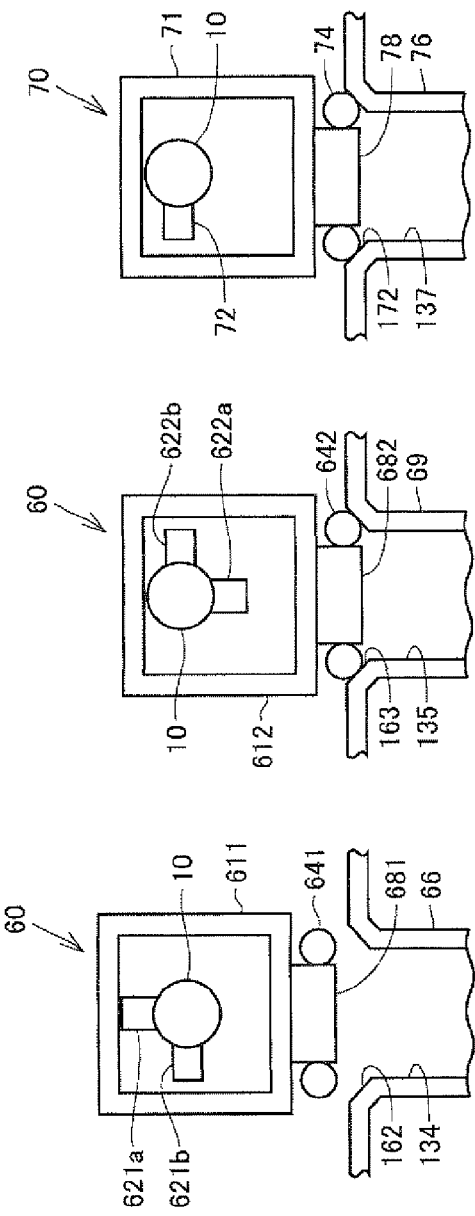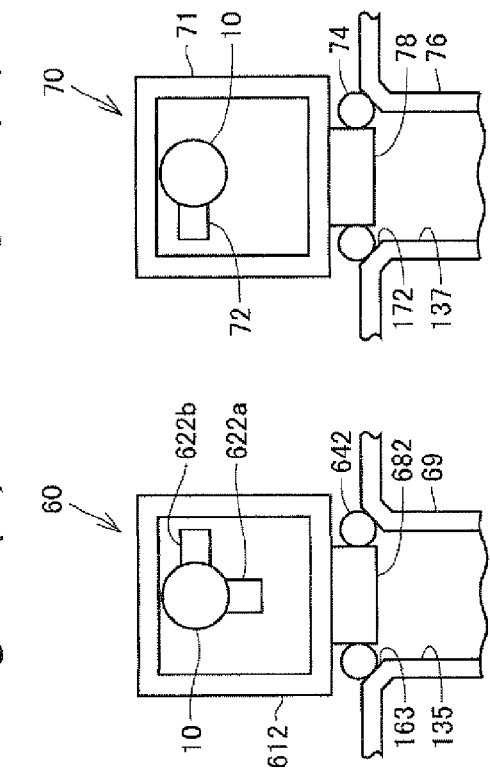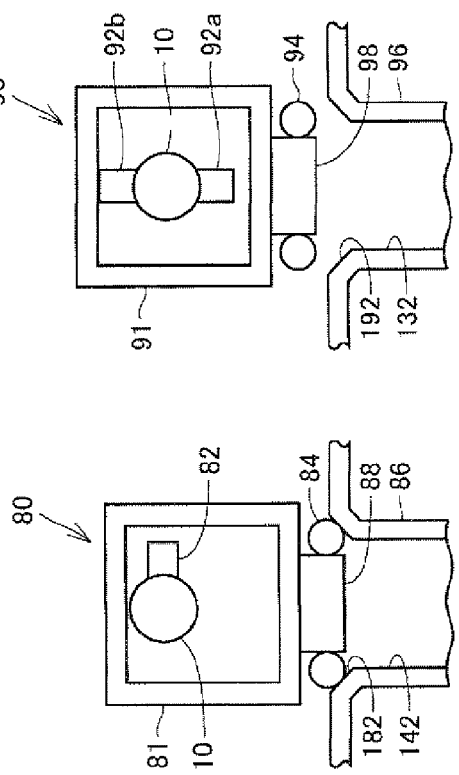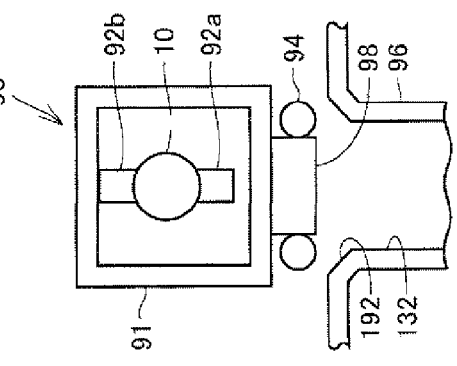

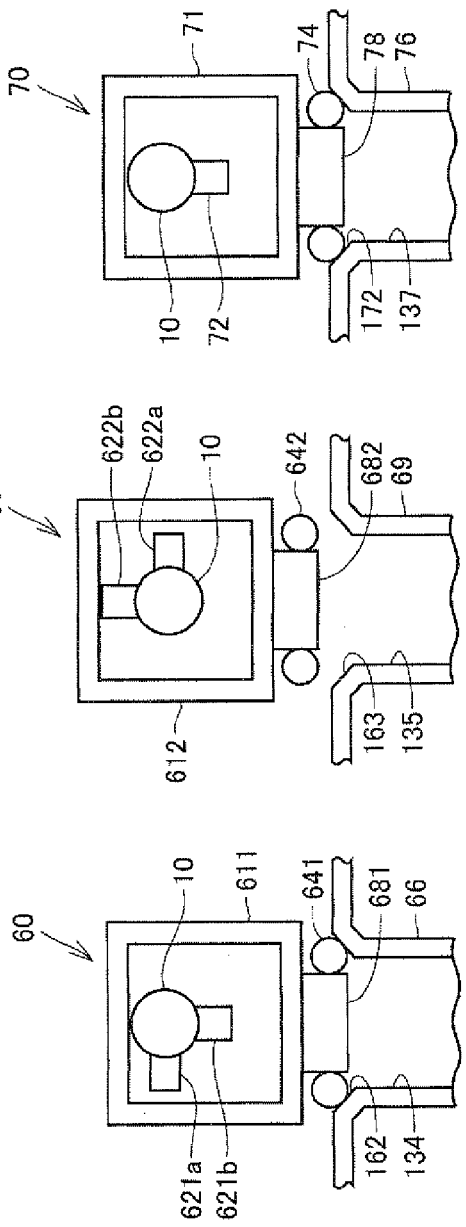

WATER PURIFIER

TECHNICAL FIELD

The present invention relates to a water purifier having a function of cleaning filter mediums.

BACKGROUND ART

Water purifiers are hitherto known that have a plurality of filter tanks as disclosed in JP 8-84989 A (PTL 1). A hollow fiber membrane water purifier disclosed in JP 8-84989 A (PTL 1) has hollow fiber membrane filters that are contained in respective filter tanks. Dirty raw water flowing into the filter tanks are purified by passing through these filters.

In a water purifier disclosed in JP 8-84989 A (PTL 1), water purified by passing through one filter or filters of one or more filter tanks washes a filter in a further filter tank.

A water purifier disclosed in JP 8-84989 A (PTL 1) has a plurality of electromagnetic valves for switching between a channel through which water passes through a first filter tank and a channel through which water passes through a second filter tank. The opening and closing of these electromagnetic valves is electronically or electromagnetically controlled by a controller.

The channel through which water passes through the first filter tank is intended to be used for, for example, producing purified water in a liquid purification device. The channel through which water passes through the second filter tank is intended to be used for, for example, backwashing the filter in the first filter tank in the liquid purification device.

CITATION LIST

Patent Literature

PTL1: JP 8-84989 A

SUMMARY OF INVENTION

Technical Problem

The electromagnetic valve that is electronically or electromagnetically controlled by a controller is more expensive than valves that are manually switched. In addition, the controller for controlling the electromagnetic valve is also relatively expensive. Furthermore, use of a large number of electromagnetic valves requires a large volume to be occupied by electric parts connecting each electromagnetic valve and the controller, which makes it difficult to reduce the size of the liquid purification device.

Therefore, there has been a demand for a water purifier of which a plurality of valves for switching between a channel intended for production of purified water and a channel intended for cleaning of a filter can be simultaneously operated to be opened or closed, the water purifier being relatively inexpensive and allowing size reduction thereof.

An object of the present invention is to provide a water purifier of which a plurality of valves for switching between a channel intended for production of purified water and a channel intended for cleaning of a filter can be simultaneously operated to be opened or closed, the water purifier being relatively inexpensive and allowing size reduction thereof.

Solution to Problem

A water purifier according to an aspect of the present invention includes a first filter tank, a second filter tank, a flow path, a plurality of valve mechanisms, and a switching portion. The first filter tank and the second filter tank (5) are intended to filtrate liquid. The flow path includes, at least, a first channel, a second channel, and a third channel. The first channel is a channel in which the liquid is filtrated in at least one of the first filter tank and the second filter tank. The second channel is a channel in which the liquid is filtrated in the second filter tank and the first filter tank is washed. The third channel is a channel in which the liquid is filtrated in the first filter tank and the second filter tank is washed. The plurality of valve mechanisms are opened and closed so as to perform switching among the first, second, and third channels. The switching portion is operated by a user of the water purifier. The switching portion actuates the plurality of valve mechanisms to perform the switching among the first, second, and third channels such that the channels are selected cyclically in order of the first channel, the second channel, the first channel, the third channel and the first channel. Each of the valve mechanisms works in junction with the operation of the switching portion.

According to the present invention, the first channel is a channel intended for production of purified water. The second and third channels are intended for washing, or cleaning, of filter mediums. Opening or closing of each of the valve mechanisms changes flow of the liquid in the flow path to thereby switch the channels among the first, second and third channels. Each valve mechanism is linked with actuation of the switching portion. The switching portion is operated by the user. In other words, the opening and closing of each valve mechanism is operated by the user. As is apparent from the above, the water purifier according to the present invention does not use electromagnetic valves. Thus, no control device for controlling such electromagnetic valves is required. Therefore, costs for the water purifier according to the present invention can be suppressed. Also, size reduction of the water purifier is possible.

In the water purifier according to the present invention, the first channel may be a channel in which the liquid is filtrated in both the first filter tank and the second filter tank. With this arrangement, use of both the first and the second filter tanks for filtration of liquid increases a flow rate in the flow path when producing purified water. In other words, even if the first and second filter tanks have relatively small volumes, a sufficient amount of liquid can be filtrated.

In the water purifier according to the present invention, the first channel may be a channel in which the liquid is filtrated in either the first filter tank or the second filter tank. And, the first channel may include a fourth channel in which the liquid is filtrated in the first filter tank and a fifth channel in which the liquid is filtrated in the second filter tank. Also, the switching portion may be configured to actuate the plurality of valve mechanisms to perform the switching among the second, third, fourth and fifth channels of the flow path such that the channels are selected cyclically in order of the fourth channel, the second channel, the fifth channel, the third channel, and the fourth channel.

With this arrangement, it is possible, for example, to switch the operational mode of the water purifier from a mode in which purified water is being produced by filtration of liquid in the first filter tank to a mode in which the first filter tank is washed using the second filter tank. Thus, if the inside of the first filter tank becomes so dirty that it is necessary to wash the inside of the first filter tank, washing of the first filter tank is carried out by changing the operational mode of the water purifier to the other mode. After washing the first filter tank, the water purifier is switched to the mode in which liquid is filtrated in the second filter tank to thereby produce purified water. Then, if the inside of the second filter tank becomes so dirty that it is necessary to wash the inside of the second filter tank, the water purifier is switched to the mode in which the second filter tank is washed using the first filter tank. At this time, that is, when washing the second filter tank, the washed first tank is used. Furthermore, after the second filter tank has been washed, the water purifier is switched to the mode in which liquid is filtrated by the first filter tank that is in a washed, relatively clean condition. As described above, with this arrangement, one filter tank in a dirty condition can be washed using liquid filtrated in the other filter tank that is in a washed, relatively clean condition.

In the water purifier according to the present invention, the plurality of valve mechanisms may, preferably, be gathered in one place.

With this arrangement, the plurality of valve mechanisms are gathered in one place. That is, the plurality of valve mechanisms are arranged so as to occupy one place. As a result, it is possible to reduce the volume to be occupied by these valve mechanisms. Also, connections between the switching portion and each valve mechanism can be simplified. This makes it possible to achieve size reduction of the water purifier.

In the water purifier according to the present invention, the switching portion may, preferably, include an operating portion and a rotating shaft. The operating portion may be configured to be operated by a user of the water purifier. The rotating shaft may, preferably, be rotatable together with the operating portion. Each valve mechanism may preferably include an inlet through which liquid flows from the flow path into the valve mechanism and an outlet through which the liquid flows out of the valve mechanism into the flow path. Also, each valve mechanism may, preferably, further include a cam fixed to the rotating shaft, a cam guide surrounding a part of the rotating shaft and a part of the cam, and a blocking portion fixed to the cam guide and configured to open or close the inlet or the outlet. Furthermore, in the water purifier according to the present invention, preferably, operation of the operating portion may allow the cam guide and the blocking portion to move in conjunction with rotation of the rotating shaft and the cam, and the movement of the cam guide and the blocking portion may allow the blocking portion to open or close the inlet or the outlet.

With the above arrangement, the rotating shaft and the cam are fixed to each other. With the operating portion operated by the user, the rotating shaft and the cam rotate together with the operating portion. Also, the cam guide and the blocking portion move in conjunction with the rotation of the rotating shaft and the cam. As a result, the blocking portion opens or closes the inlet or the outlet. Thus, in the water purifier according to the present invention, electromagnetic valves are not used and the cam is actuated, or activated by the user operating the operating portion. Furthermore, actuation of the cam actuates each valve mechanism. Therefore, it is possible to reduce costs involved in this water purifier and reduce size of the water purifier.

Advantageous Effects of Invention

As described above, according to the present invention, it is possible to achieve a water purifier which is configured so as to simultaneously perform opening/closing operations of a plurality of valve mechanisms for performing switching between a channel used for production of purified water and a channel used for washing filter mediums, so that water purifier can be relatively inexpensive and have a reduced size.

BRIEF DESCRIPTION OF DRAWINGS

FIGS. 9(A)-9(E) schematically show operational states of each of the valve mechanisms when water flows through an example of a first channel in the water purifier according to the first embodiment of the present invention, wherein FIG. 9(A) shows a part of one valve mechanism, FIG. 9(B) shows another part of the valve mechanism, FIG. 9(C) shows a part of another valve mechanism, FIG. 9(D) shows another part of the another valve mechanism and FIG. 9(E) shows a part of a further valve mechanism;

FIGS. 10(A)-10(E) schematically show operational states of each of the valve mechanisms when water flows through a second channel in the water purifier according to the first embodiment of the present invention, wherein FIG. 10(A) shows a part of one valve mechanism, FIG. 10(B) shows another part of the valve mechanism, FIG. 10(C) shows a part of another valve mechanism, FIG. 10(D) shows another part of the another valve mechanism and FIG. 10(E) shows a part of a further valve mechanism;

FIGS. 11(A)-11(E) schematically show operational states of each of the valve mechanisms when water flows through another example of the first channel in the water purifier according to the first embodiment of the present invention, wherein FIG. 11(A) shows a part of one valve mechanism, FIG. 11(B) shows another part of the valve mechanism, FIG. 11(C) shows a part of another valve mechanism, FIG. 11(D) shows another part of the another valve mechanism and FIG. 11(E) shows a part of a further valve mechanism;

FIGS. 12(A)-12(E) schematically show operational states of each of the valve mechanisms when water flows through a third channel in the water purifier according to the first embodiment of the present invention, wherein FIG. 12(A) shows a part of one valve mechanism, FIG. 12(B) shows another part of the valve mechanism, FIG. 12(C) shows a part of another valve mechanism, FIG. 12(D) shows another part of the another valve mechanism and FIG. 12(E) shows a part of a further valve mechanism;

FIGS. 13(A)-13(E) schematically show operational states of each of the valve mechanisms when water flows through a fourth channel in the water purifier according to a second embodiment of the present invention, wherein FIG. 13(A) shows a part of one valve mechanism, FIG. 13(B) shows another part of the valve mechanism, FIG. 13(C) shows a part of another valve mechanism, FIG. 13(D) shows another part of the another valve mechanism and FIG. 13(E) shows a part of a further valve mechanism;

FIGS. 14(A)-14(E) schematically show operational states of each of the valve mechanisms when water flows through the second channel in the water purifier according to a second embodiment of the present invention, wherein FIG. 14(A) shows a part of one valve mechanism, FIG. 14(B) shows another part of the valve mechanism, FIG. 14(C) shows a part of another valve mechanism, FIG. 14(D) shows another part of the another valve mechanism and FIG. 14(E) shows a part of a further valve mechanism;

FIGS. 15(A)-15(E) schematically show operational states of each of the valve mechanisms when water flows through a fifth channel in the water purifier according to the second embodiment of the present invention, wherein FIG. 15(A) shows a part of one valve mechanism, FIG. 15(B) shows another part of the valve mechanism, FIG. 15(C) shows a part of another valve mechanism, FIG. 15(D) shows another part of the another valve mechanism and FIG. 15(E) shows a part of a further valve mechanism; and FIGS. 16(A)-16(E) schematically show operational states of each of the valve mechanisms when water flows through a third channel in the water purifier according to the second embodiment of the present invention, wherein FIG. 16(A) shows a part of one valve mechanism, FIG. 16(B) shows another part of the valve mechanism, FIG. 16(C) shows a part of another valve mechanism, FIG. 16(D) shows another part of the another valve mechanism and FIG. 16(E) shows a part of a further valve mechanism.

DESCRIPTION OF EMBODIMENTS

A description will be given below of embodiments according to the present invention with reference to the accompanying drawings.

First Embodiment

Figure 1:
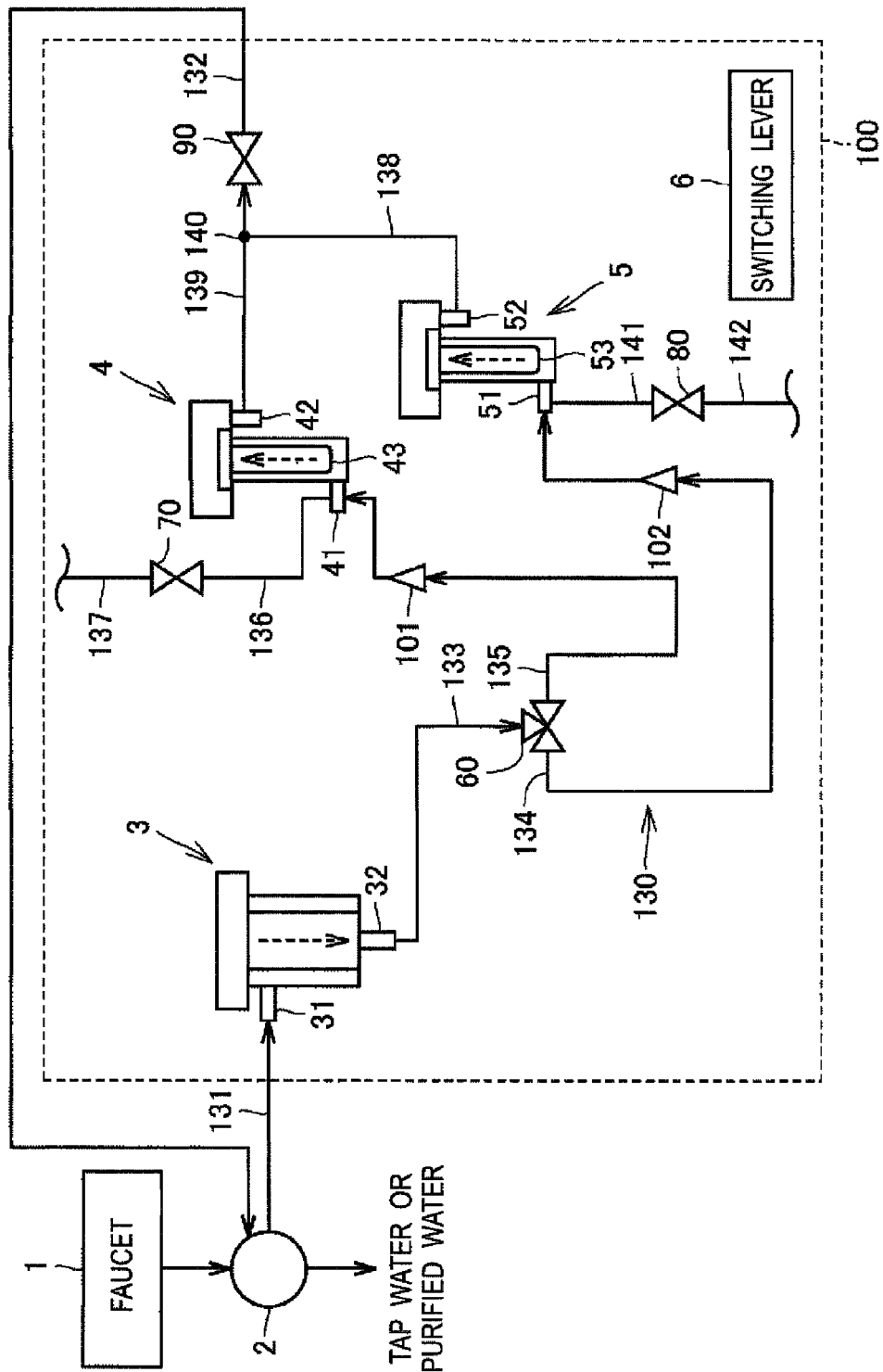
FIG. 1 is a diagram showing water flow when a water purifier according to a first embodiment of the present invention purifies raw water.

As shown in FIG. 1, a water purifier 100 is provided with flow paths 131, 132, 133, 134, 135, 136, 137, 138, 139, 141 and 142 as components of a flow system 130. Further, the water purifier 100 is provided with an activated carbon filter tank 3, a filter tank 4 as an example of the first filter tank, and a filter tank 5 as an example of the second filter tank. Each of the flow paths 131, 132, 133, 134, 135, 136, 137, 138, 139, 141 and 142 is formed by a tubular member such as, for example, a hose.

The activated carbon filter tank 3 removes chlorine, odor and/or trihalomethane included in raw water. A porous material, such as an activated carbon, is utilized in the activated carbon filter tank 3. On the other hand, a filter medium 43 accommodated in the filter tank 4 and a filter medium 53 accommodated in the filter tank 5 remove fine particles such as bacteria, viruses or the like. A micro filtration membrane (MF membrane), an ultra filtration membrane (UF membrane), a nano filtration membrane (NF membrane), a reverse osmosis membrane (RO membrane) or the like is utilized for the filter medium 43 and the filter medium 53 in correspondence to a subject to be removed.

The flow system 130 is provided for circulating water serving as liquid. The flow path 131 in the flow system 130 connects a branch water faucet 2 and the activated carbon filter tank 3. One end of the flow path 131 is connected to the branch water faucet 2, and the other end of the flow path 131 is connected to an inflow nozzle 31 of the activated carbon filter tank 3. One end of the flow path 133 is connected to an outflow nozzle 32 of the activated carbon filter tank 3, and the other end of the flow path 133 is connected to a valve mechanism 60. Further, one end of the flow path 134 and one end of the flow path 135 are connected to the valve mechanism 60.

The other end of the flow path 135 is connected to a nozzle 41 of the filter tank 4. A check valve 101 is arranged in the flow path 135. On the other hand, the other end of the flow path 134 is connected to a nozzle 51 of the filter tank 5. A check valve 102 is arranged in the flow path 134.

One end of the flow path 136 is connected to the nozzle 41 of the filter tank 4. The other end of the flow path 136 and one end of the flow path 137 are connected to a valve mechanism 70. Further, one end of the flow path 139 is connected to a nozzle 42 of the filter tank 4. The other end of the flow path 139 is connected to a valve mechanism 90. Further, one end of the flow path 132 is connected to the valve mechanism 90. The other end of the flow path 132 is connected to the branch water faucet 2.

One end of the flow path 138 is connected to a nozzle 52 of the filter tank 5. The other end of the flow path 138 is connected to the flow path 139 by a connection portion 140. Water flowing between the filter tank 4 and the filter tank 5 circulates through the flow path 138 and the flow path 139. One end of the flow path 141 is connected to a nozzle 51 of the filter tank 5. The other end of the flow path 141 is connected to a valve mechanism 80. Further, one end of the flow path 142 is connected to the valve mechanism 80.

Tap water serving as the raw water is supplied to the water purifier 100 via the branch water faucet 2 when a user of the water purifier 100 opens a faucet 1. The raw water is not limited to the tap water, but may be well water or river water.

The water flowing into the branch water faucet 2 by the opening of the faucet 1 is flowed out of the branch water faucet 2 as the tap water or is flowed into the water purifier 100 through the flow path 131, according to an operation of a lever (not shown) of the branch water faucet 2. In the case that the purified water is to be produced in the water purifier 100, the water flows out of the branch water faucet 2 through the flow path 131 via the inflow nozzle 31 into the activated carbon filter tank 3. The water circulating through an inner portion of the activated carbon filter tank 3 flows out into the flow path 133 via the outflow nozzle 32. The water circulating through the flow path 133 starts flowing toward the flow path 135 and the flow path 134 via the valve mechanism 60. In other words, in the case that the purified water is to be produced in the water purifier 100, the valve mechanism 60 opens between the flow path 133 and the flow path 134, and opens between the flow path 133 and the flow path 135. The water flowing through the flow path 135 flows into the inner portion of the filter tank 4 via the nozzle 41. Further, the water flowing through the flow path 134 flows into the inner portion of the filter tank 5. In the case that the purified water is to be produced in the water purifier 100, the valve mechanism 70 closes between the flow path 136 and the flow path 137, the valve mechanism 80 closes between the flow path 141 and the flow path 142, and the valve mechanism 90 opens between the flow path 139 and the flow path 132.

The water circulating through the inner portion of the filter tank 4 is filtrated by the filter medium 43, and the purified water is produced. Further, the water circulating through the inner portion of the filter tank 5 is filtrated by the filter medium 53, and the purified water is produced. The purified water flows into the valve mechanism 90 while passing through the flow path 138 and the flow path 139. The purified water is supplied to outside of the water purifier 100 through the flow path 132 after passing through the valve mechanism 90. As is apparent from the above, in the water purifier 100, the flow system 130 has a first channel in which the water is filtrated in the filter tank 4 and the filter tank 5. An example of the first channel is constructed by, at least the flow paths 131, 133, 134, 135, 138, 139 and 132.

Figure 2:
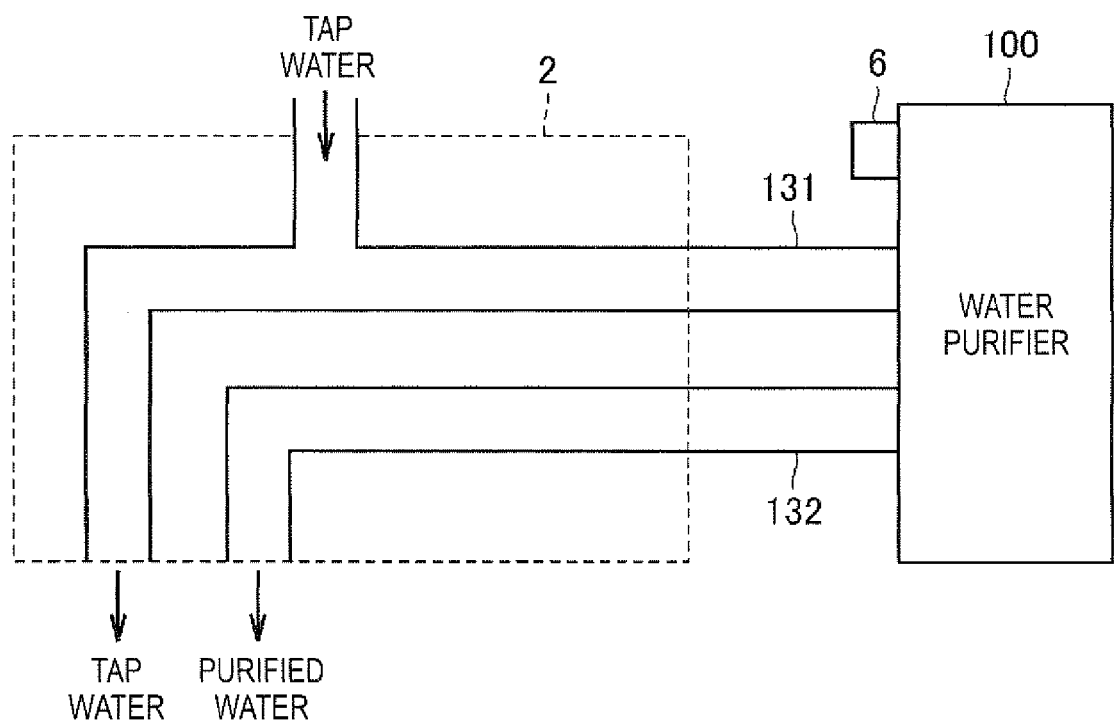
FIG. 2 is a schematic diagram of a branch water faucet of the water purifier according to the present invention.

As shown in FIG. 2, the branch water faucet 2 can switch the direction in which the tap water flows between a direction in which the tap water flows from the branch water faucet 2 toward the water purifier 100 and a direction in which the tap water flows from the branch water faucet 2 toward an outer side of the branch water faucet 2. Further, in the case that the tap water flows from the branch water faucet 2 toward the water purifier 100, the purified water flows from the water purifier 100 toward the branch water faucet 2. The purified water flowing toward the branch water faucet 2 from the water purifier 100 flows toward the outer side of the branch water faucet 2 from the branch water faucet 2, so that the purified water is supplied to the user.

Figure 3:
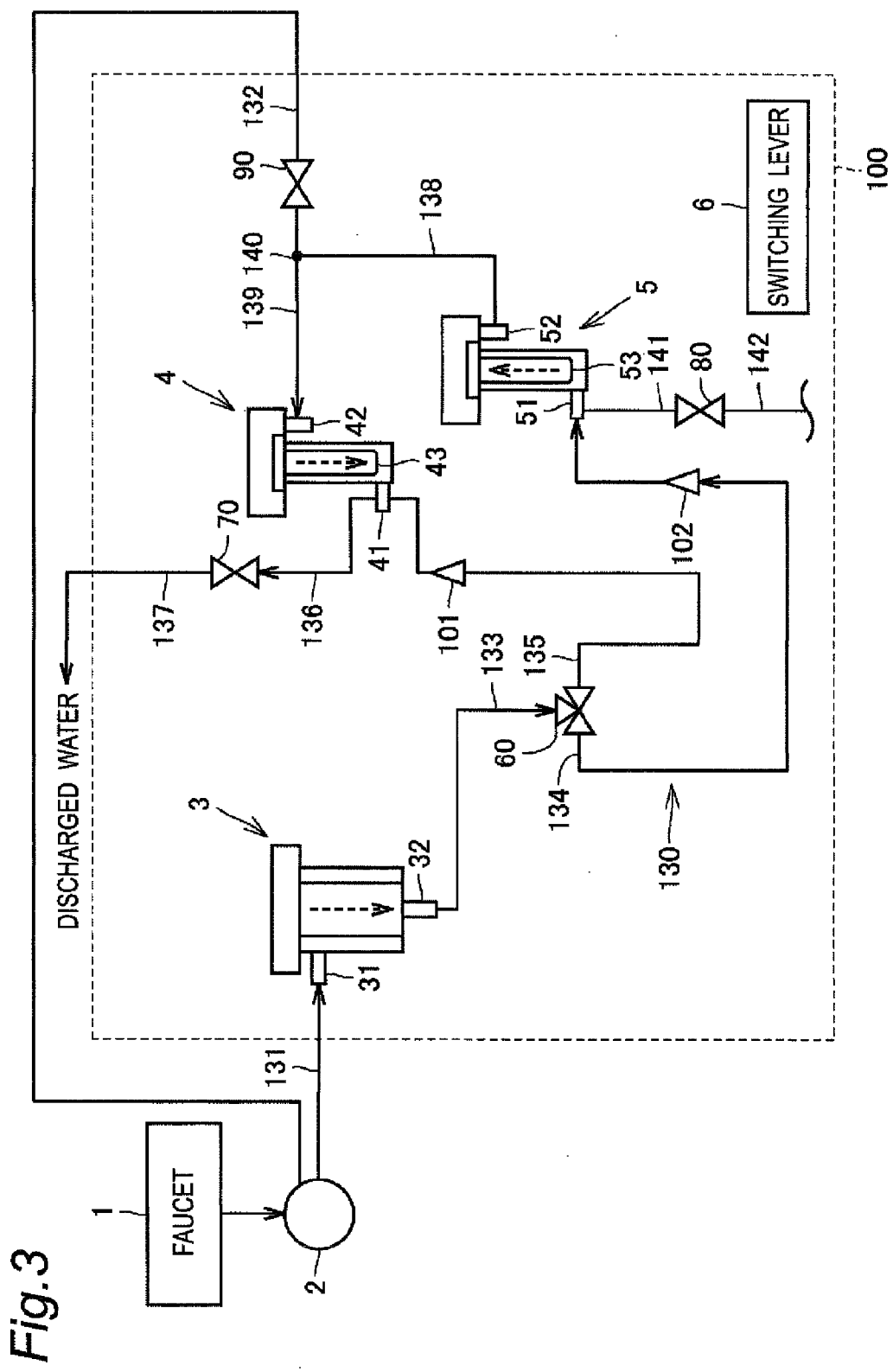
FIG. 3 is a diagram showing water flow when the water purifier according to the first embodiment of the present invention washes a filter medium in a first filter tank.

As shown in FIG. 3, in the case that the filter tank 4 is to be washed in the water purifier 100, the valve mechanism 70 opens between the flow path 136 and the flow path 137, the valve mechanism 80 closes between the flow path 141 and the flow path 142, and the valve mechanism 90 closes between the flow path 139 and the flow path 132. In the case that the filter tank 4 is to be washed in the water purifier 100, the water circulating through the flow path 133 is switched in its flowing direction by the valve mechanism 60, and flows toward the flow path 134. The water flowing through the flow path 134 flows into the inner portion of the filter tank 5 via the nozzle 51. The water circulating through the inner portion of the filter tank 5 is filtrated by the filter medium 53, so that the purified water is produced. The water filtrated by the filter medium 53 flows through the flow path 138 and the flow path 139 into the inner portion of the filter tank 4 via the nozzle 42.

In the case that the filter medium 43 of the filter tank 4 is washed, the water circulates through the filter medium 43 in an opposite direction to a direction in the case that the purified water is produced in the filter tank 4. The water used for reverse washing the filter medium 43 flows out of the nozzle 41 to the flow path 136, and is further discharged out of the water purifier 100 through the flow path 137. As mentioned above, in the water purifier 100, the flow system 130 has a second channel in which the liquid is filtrated in the filter tank 5 and the filter tank 4 is washed. An example of the second channel is constructed at least by the flow paths 131, 133, 134, 138, 139, 136 and 137.

Figure 4:
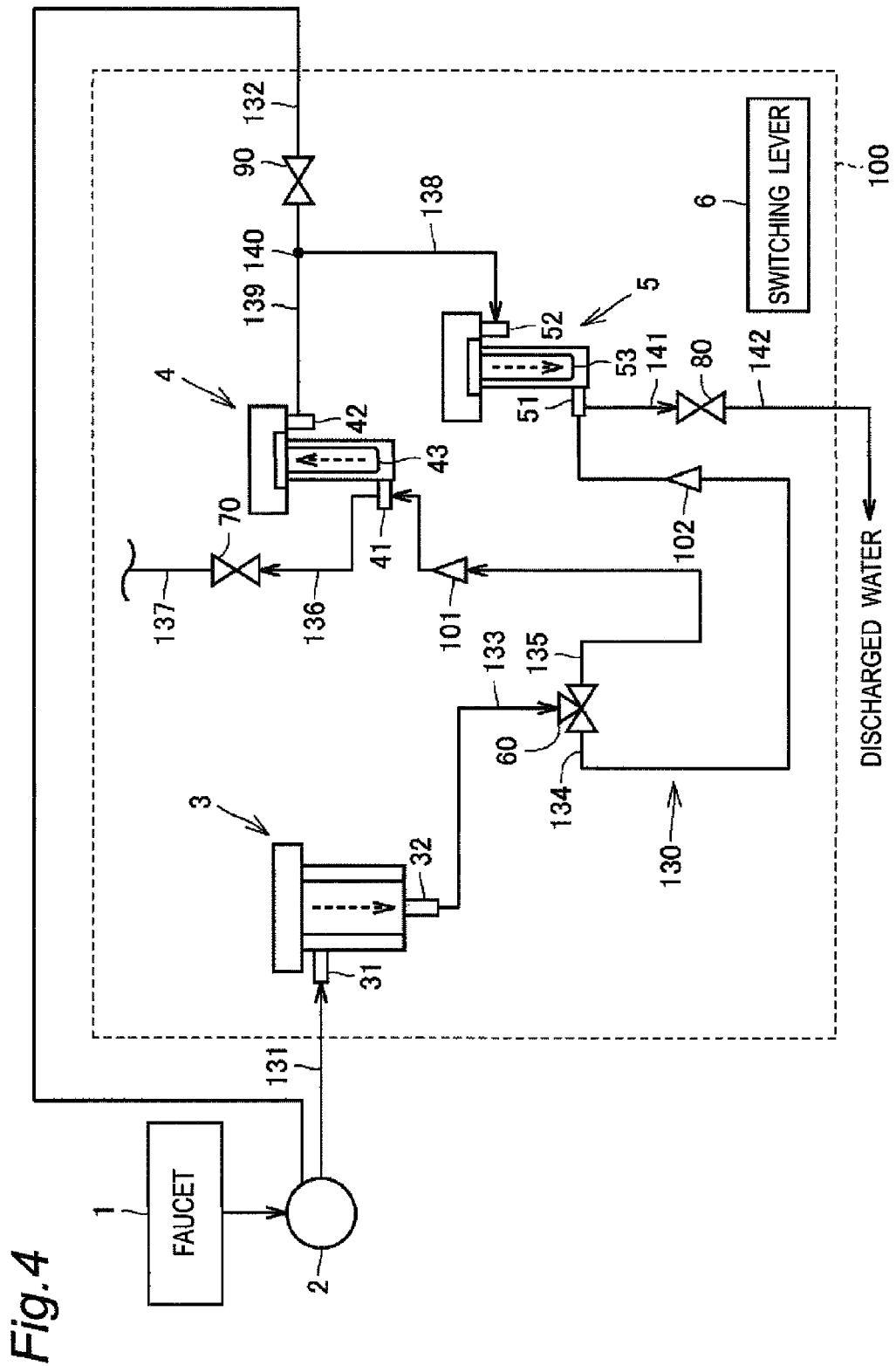
FIG. 4 is a diagram showing water flow when the water purifier according to the first embodiment of the present invention washes a filter medium in a second filter tank.

On the other hand, in the case that the filter tank 5 is washed in the water purifier 100, the valve mechanism 70 closes between the flow path 136 and the flow path 137, the valve mechanism 80 opens between the flow path 141 and the flow path 142, and the valve mechanism 90 closes between the flow path 139 and the flow path 132. As shown in FIG. 4, when the filter tank 5 is washed in the water purifier 100, the flowing direction of the water circulating through the flow path 133 is switched by the valve mechanism 60, so that the water flows toward the flow path 135. The water flowing through the flow path 135 flows into the inner portion of the filter tank 4 via the nozzle 41. The water circulating through the inner portion of the filter tank 4 is filtrated by the filter medium 43, so that the purified water is produced. The water filtrated by the filter medium 43 flows through the flow path 139 and the flow path 138 into the inner portion of the filter tank 5 via the nozzle 52.

When the filter medium 53 of the filter tank 5 is washed, the water circulates through the filter medium 53 in an opposite direction to a direction to be assumed when the purified water is produced in the filter tank 5. The water used for reverse washing the filter medium 53 is discharged from the nozzle 51 to outside of the water purifier 100 through the flow path 141 and the flow path 142. Although an illustration is omitted, the flow path 142 may be connected to the flow path 137. As is apparent from the above, in the water purifier 100, the flow system 130 has a third channel in which the liquid is filtrated in the filter tank 4 and the filter tank 5 is washed. An example of the third channel is constructed by at least the flow paths 131, 133, 135, 139, 138, 141 and 142. As mentioned above, the valve mechanism 60, the valve mechanism 70, the valve mechanism 80 and the valve mechanism 90 are opened and closed so as to switch the first channel, the second channel and the third channel.

Figure 5:
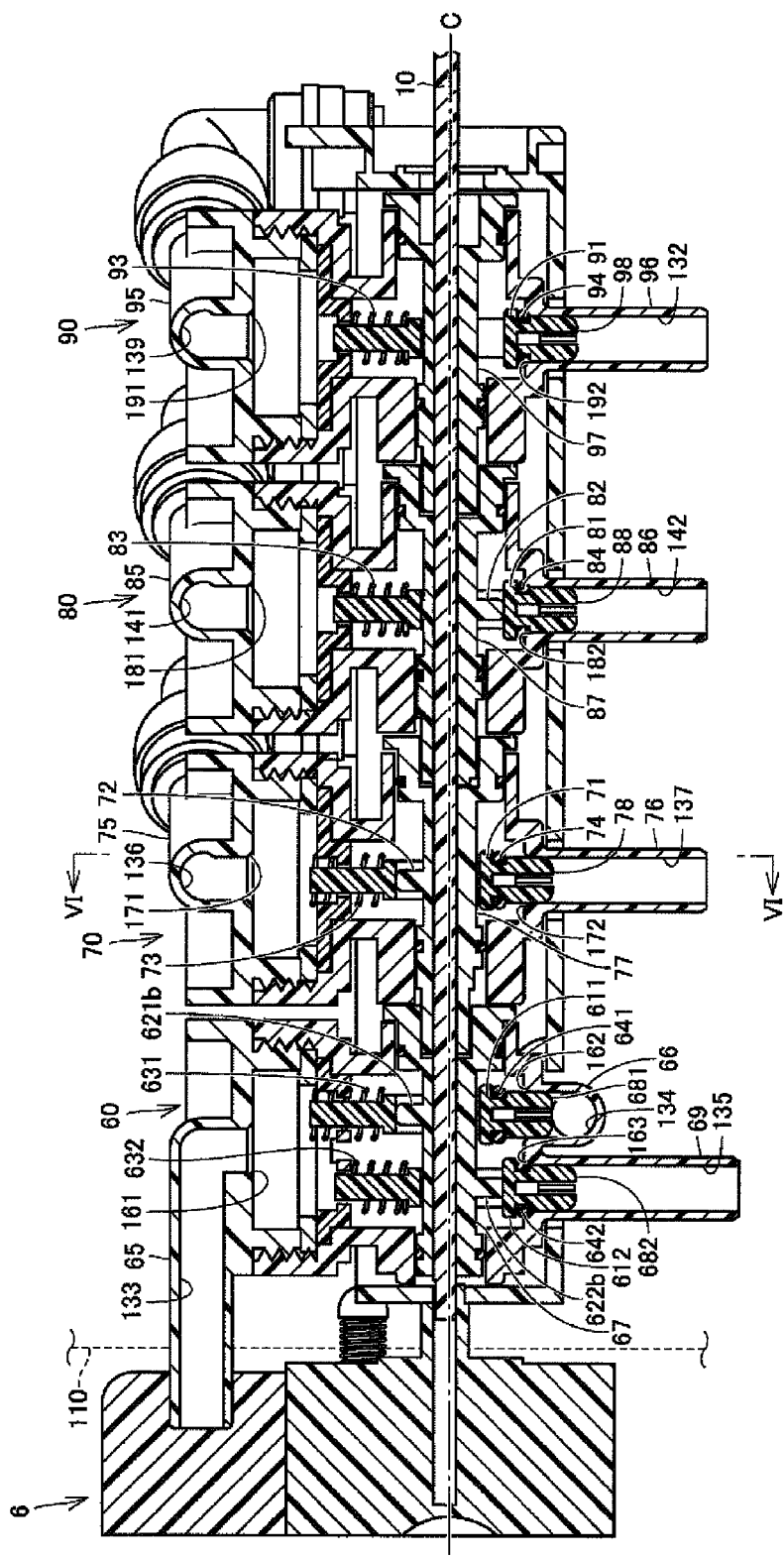
FIG. 5 is a sectional view of a plurality of valve mechanisms of the water purifier according to the present invention.

A description will be given below of structures of the valve mechanisms 60, 70, 80 and 90. As shown in FIG. 5, the valve mechanism 60, the valve mechanism 70, the valve mechanism 80 and the valve mechanism. 90 are brought together in one place in the inner portion of the case 110, in the water purifier 100. The flow system 130 except at least a part of the flow path 131 and a part of the flow path 132, the valve mechanism 60, the valve mechanism 70, the valve mechanism 80 and the valve mechanism 90 are accommodated in the case 110. The case 110 forms a part of an outer shell of the water purifier 100. The water purifier 100 is provided with a switching lever 6. The switching lever 6 is operated by the user of the water purifier 100. The switching lever 6 is arranged in the outer side of the case 110 so that the user can operate the switching lever 6.

The switching lever 6 is connected to a rotating shaft 10. The rotating shaft 10 rotates around an axis of rotation C together with the switching lever 6. The switching lever 6 is an example of an operating portion. Further, in the water purifier 100, the rotating shaft 10 and the switching lever 6 are an example of the switching portion. With the switching lever 6 being operated by the user, the valve mechanism 60, the valve mechanism 70, the valve mechanism 80 and the valve mechanism 90 are actuated. The rotating shaft 10 passes through the valve mechanism 60, the valve mechanism 70, the valve mechanism 80 and the valve mechanism 90. In other words, a length of the rotating shaft 10 is longer than combined widths (a magnitude in a lateral direction in FIG. 5) of the valve mechanism 60, the valve mechanism 70, the valve mechanism 80 and the valve mechanism 90.

Figure 6:
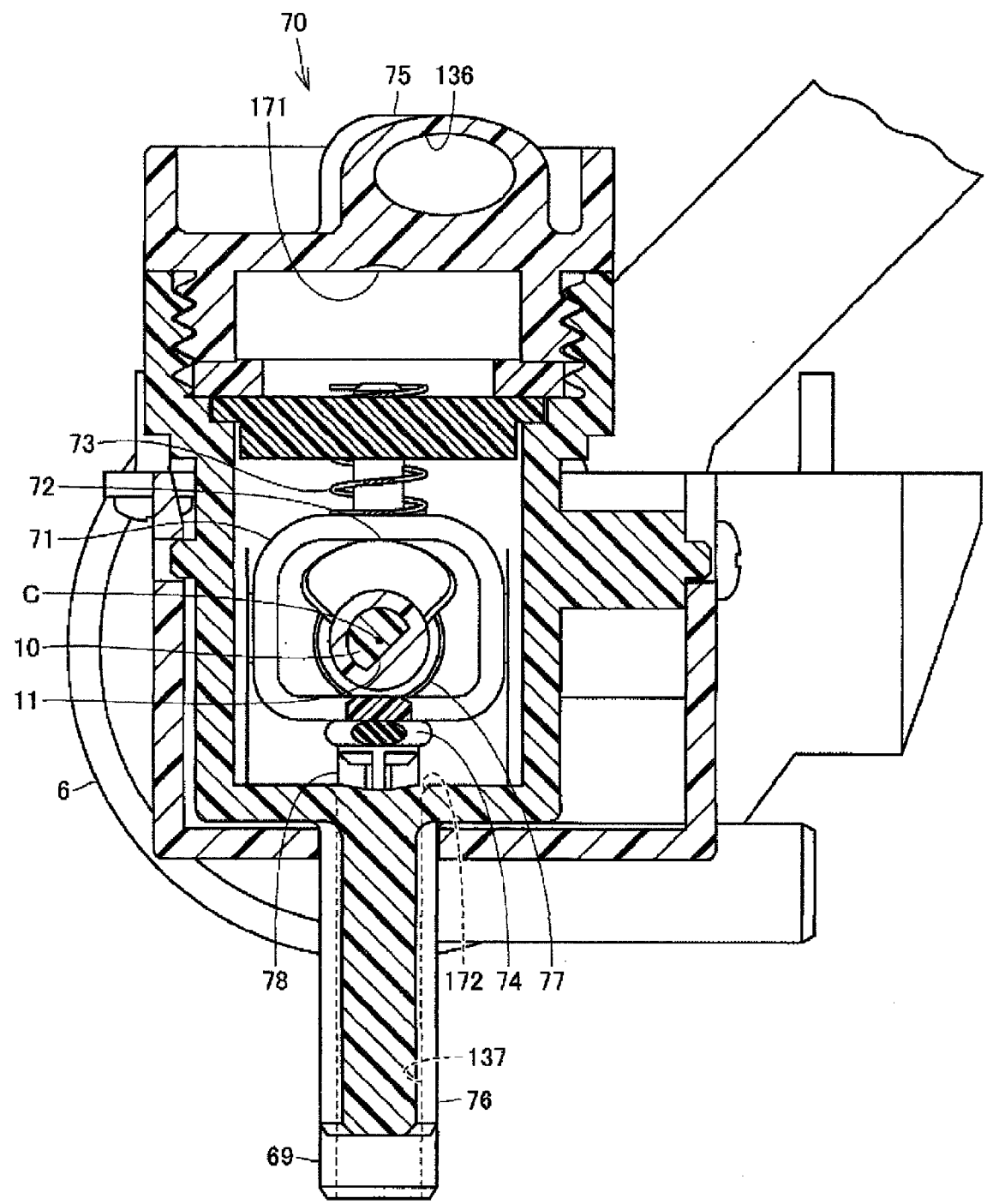
FIG. 6 is an enlarged sectional view taken along a VI-VI line of FIG. 5.

As shown in FIG. 6, the valve mechanism 70 has an inlet 171 through which the water from the flow path 136 flows into the valve mechanism 70, and an outlet 172 through which the water flows out of the valve mechanism 70 into the flow path 137. A part of the flow path 136 is formed within an inflow nozzle 75 of the valve mechanism 70. A part of the flow path 137 is formed within an outflow nozzle 76 of the valve mechanism 70.

The valve mechanism 70 has a cam 77, a cam guide 71 and a leg portion 78. The cam 77 is fixed to an outer surface 11 of the rotating shaft 10. A protruding portion 72 protruding outward from the cam 77 is formed on a part of the cam 77. The cam guide 71 surrounds a part of the rotating shaft 10 and a part of the cam 77 from four sides in a lateral direction and a vertical direction of FIG. 6. The protruding portion 72 formed on the cam 77 is surrounded by the cam guide 71. The leg portion 78 is fixed to the cam guide 71 and extends from the cam guide 71 toward the outlet 172. An annular member 74 is attached to a joint between the cam guide 71 and the leg portion 78, or a root of the leg portion 78. The annular member 74 is formed by an elastic material such as a rubber. In the valve mechanism 70 of the water purifier 100, a blocking portion is constructed at least by the leg portion 78 and the annular member 74. The cam guide 71 is biased, or urged, from an upper side toward a lower side in FIG. 6 by a spring 73 so that the blocking portion closes the outlet 172.

FIG. 5 shows a case that the filter tank 4 is washed by using the water which has been purified by the filter tank 5 (in other words, a case that the water flows through the second channel). As shown in FIG. 5, the valve mechanism 90 has an inlet 191 which allows the water to flow into the valve mechanism 90 from the flow path 139, and an outlet 192 which allows the water to flow out of the valve mechanism 90 to the flow path 132. A part of the flow path 139 is formed within an inflow nozzle 95 of the valve mechanism 90. A part of the flow path 132 is formed within an outflow nozzle 96. The valve mechanism 90 has a cam 97, a cam guide 91 and a leg portion 98. An annular member 94 formed by an elastic material is attached to a joint between of the cam guide 91 and the leg portion 98, namely a root of the leg portion 98. A protruding portion 92a (refer to FIG. 10(E)) and a protruding portion 92b which protrude outward from the can 97 are formed in a part of the can 97. The protruding portion 92a and the protruding portion 92b are surrounded by the cam guide 91. The cam guide 91 is biased, or urged from an upper side toward a lower side, as viewed in FIG. 5, by a spring 93 so that the annular member 94 of the leg portion 98 closes the outlet 192.

The valve mechanism 80 has an inlet 181 which allows the water to flow into the valve mechanism 80 from the flow path 141, and an outlet 182 which allows the water to flow out of the valve mechanism 80 to the flow path 142. A part of the flow path 141 is formed within an inflow nozzle 85 of the valve mechanism 80. A part of the flow path 142 is formed within an outflow nozzle 86 of the valve mechanism 80. The valve mechanism 80 has a cam 87, a cam guide 81 and a leg portion 88. An annular member 84 formed by an elastic material is attached to roots of the cam guide 81 and the leg portion 88. A protruding portion 82 protruding out of the cam 87 to an outer side is formed on a part of the cam 87. The protruding portion 82 is surrounded by the cam guide 81. The cam guide 81 is biased from an upper side toward a lower side as viewed in FIG. 5 by a spring 83 so that the annular member 84 of the leg portion 88 closes the outlet 82.

The valve mechanism 60 has an inlet 161 which allows the water to flow into the valve mechanism 60 from the flow path 133, an outlet 162 which allows the water to flow out of the valve mechanism 60 to the flow path 134, and an outlet 163 which allows the water to flow out of the valve mechanism 60 to the flow path 135. A part of the flow path 133 is formed within an inflow nozzle 65 of the valve mechanism 60. A part of the flow path 134 is formed within an outflow nozzle 66 of the valve mechanism 60. A part of the flow path 135 is formed within an outflow nozzle 69 of the valve mechanism 60. As mentioned above, in the water purifier 100, the valve mechanism 60 has one inlet 161 and two outlets 162 and 163.

The valve mechanism 60 has a cam 67, a cam guide 611 and a leg portion 681. An annular member 641 formed by an elastic material is attached to a joint between the cam guide 611 and the leg portion 681, in other words, a root of the leg portion 681. The cam guide 611 is biased from an upper side toward a lower side as viewed in FIG. 5 by a spring 631 so that the annular member 641 of the leg portion 681 closes the outlet 162. Protruding portions 621a, 621b and 621c (refer to FIG. 10(A)) protruding out of the cam 67 to an outer side are formed in a part of the cam 67. The protruding portions 621a, 621b and 621c are surrounded by the cam guide 611. Further, in a left side in FIG. 5 of the protruding portions 621a, 621b and 621c, protruding portions 622a, 622b and 622c (refer to FIG. 10(B)) protruding out of the cam 67 to an outer side are formed in the other part of the cam 67. The valve mechanism 60 further has a cam guide 612, and a leg portion 682. The protruding portions 622a, 622b and 622c are surrounded by the cam guide 612. An annular member 642 formed by an elastic material is attached to a joint between the cam guide 612 and the leg portion 682, namely a root of the leg portion 682. The cam guide 612 is biased from an upper side to a lower side as viewed in FIG. 5 by a spring 632 so that the annular member 642 of the leg portion 682 closes the outlet 163.

Figure 7:
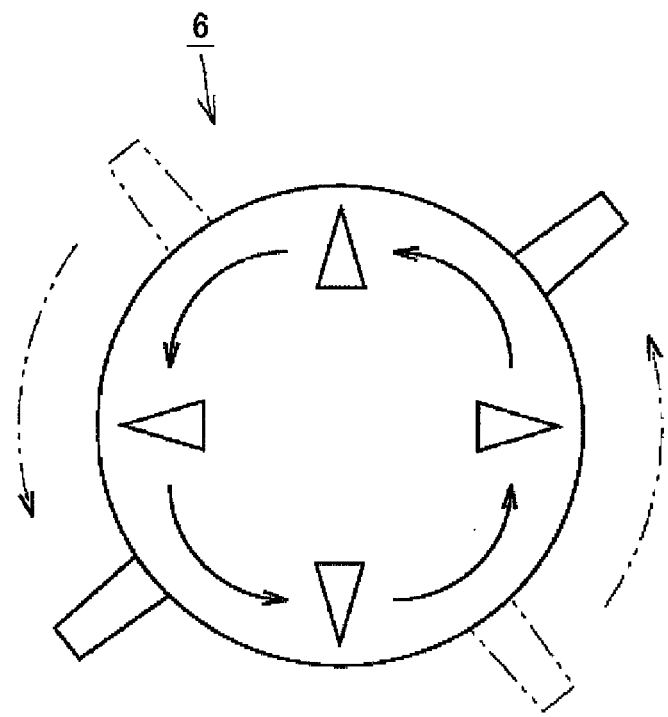
FIG. 7 schematically shows a switching lever of the water purifier according to the present invention.

FIG. 7 shows a schematic front view of the switching lever 6 as seen from the left side in FIG. 5. In the front view of the switching lever 6 shown in FIG. 7, the user can rotate the switching lever 6 in a counterclockwise direction. The rotating directions of the switching lever 6 and the rotating shaft 10 are limited to one direction since the switching lever 6 and the rotating shaft 10 are mechanically connected to a ratchet mechanism (not shown).

The switching lever 6 rotates at intervals of about 90 degrees around the rotating shaft C (refer to FIG. 6) by the operation of the user. Every time the switching lever 6 is rotated by about 90 degrees, the operational mode of the water purifier 100 is switched in the order of a first washing mode, a first purification mode, a second washing mode, a second purification mode and the first washing mode in a cyclic manner. In the case that the operational mode of the water purifier 100 is the first purification mode or the second purification mode, the water flows through the same channel (that is, the first channel) in the flow system 130 of the water purifier 100. The first purification mode and the second purification mode form a state in which the water is filtrated by the filter tank 4 and the filter tank 5. As mentioned above, the water circulates through the first channel in both the first purification mode and the second purification mode. As is known by referring to FIGS. 9 and 11, positions of the protruding portions 621a, 621b, 621c, 622a, 622b, 622c, 72, 82, 92a and 92b are different between a state of the first purification mode and a state of the second purification mode.

On the other hand, the first washing mode forms a state in which the water flows through the second channel in the water purifier 100. In other words, it is a state in which the filter tank 4 is washed by using the water filtrated by the filter tank 5. Further, the second washing mode forms a state in which the water flows through the third channel in the water purifier 100. In other words, it is a state in which the filter tank 5 is washed by using the water filtrated by the filter tank 4. In the case that the order of the respective modes is expressed by the order of the respective channels, the respective channels are switched in the order of the second channel, the first channel, the third channel, the first channel and the second channel in the water purifier 100. As mentioned above, in the water purifier 100, the first channel, the second channel and the third channel in the flow system 130 are switched so as to be selected cyclically in the order of the first channel, the second channel, the first channel, the third channel and the first channel.

Figure 8:
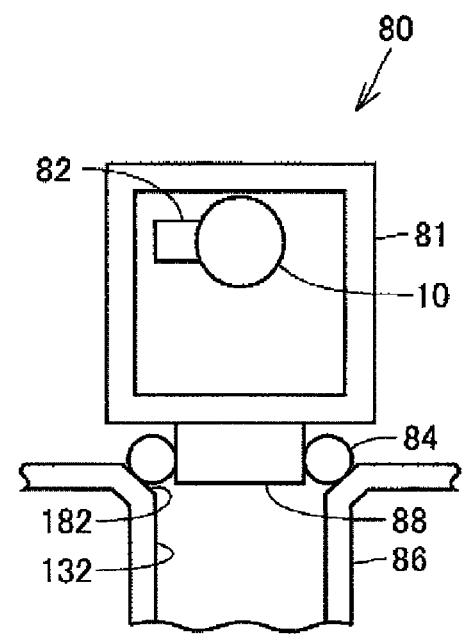
FIG. 8 is a schematic view of a valve mechanism of the water purifier according to the present invention.

FIG. 8 is a view schematically showing the valve mechanism 80. The valve mechanism 80 shown in FIG. 8 is in a state in which the annular member 84 of the leg portion 88 closes the outlet 182. At this time, the mode of the water purifier 100 is the second purification mode. On the other hand, in the case that the mode of the water purifier 100 is the first washing mode or the second washing mode, the valve mechanism 80 is in a state in which the annular member 84 of the leg portion 88 opens the outlet 182, as mentioned later.

FIG. 9 is a view schematically showing operative, or working states, of the valve mechanisms 60, 70, 80 and 90 in the case that the mode of the water purifier 100 is the second purification mode (that is, in the case that the water flows through the first channel). In the case that the mode of the water purifier 100 is the second purification mode, the valve mechanism 60 is in a state in which the annular member 641 of the leg portion 681 opens the outlet 162 as shown in FIG. 9(A). In this state, the protruding portion 621c comes into contact with a ceiling of an inner surface of the cam guide 611. Further, as shown in FIG. 9(B), the valve mechanism 60 is in a state in which the annular member 642 of the leg portion 682 opens the outlet 163. In this state, the protruding portion 622a comes into contact with a ceiling of an inner surface of the cam guide 612. In the case that the mode of the water purifier 100 is the second purification mode as mentioned above, the valve mechanism 60 opens between the flow path 133 (refer to FIG. 1) and the flow path 134 and opens between the flow path 133 and the flow path 135.

As shown in FIG. 9(C), the valve mechanism 70 is in a state in which the annular member 74 of the leg portion 78 closes the outlet 172. As shown in FIG. 9(D), the valve mechanism 80 is in a state in which the annular member 84 of the leg portion 88 closes the outlet 182. On the other hand, as shown in FIG. 9(E), the valve mechanism 90 is in a state in which the annular member 94 of the leg portion 98 opens the outlet 192. In this state, the protruding portion 92a comes into contact with a ceiling of an inner surface of the cam guide 91. As mentioned above, in the second purification mode, the valve mechanism 70 blocks the water flow in the flow path 137, the valve mechanism 80 blocks the water flow in the flow path 142, and the valve mechanism 90 releases the water flow in the flow path 132.

FIG. 10 is a view schematically showing operative, or working states, of the valve mechanisms 60, 70, 80 and 90 in the case that the water purifier 100 washes the filter medium 43 of the filter tank 4 (that is, in the case that the mode of the water purifier 100 is the first washing mode, and the water flows through the second channel). As shown in FIG. 10(A), in the case that the water purifier 100 washes the filter medium 43 (refer to FIG. 3), the valve mechanism 60 is in a state in which the annular member 641 of the leg portion 681 opens the outlet 162.

In the case that the mode is switched from the second purification mode to the first washing mode, the rotating shaft 10 rotates at about 90 degrees in the inner portion of the cam guide 611. As a result, the protruding portion 621b is arranged at a position at which the protruding portion comes into contact with the ceiling of the inner surface of the cam guide 611 as shown in FIG. 10(A). During the time the switching lever 6 rotates by about 90 degrees in a counterclockwise direction, the protruding portion 621b moves the cam guide 611 upward while coming into contact with the ceiling of the inner surface of the cam guide 611 in place of the protruding portion 621c. As mentioned above, since the cam guide 611 moves upward as a driven element to the cam 67 (refer to FIG. 5), the leg portion 681 fixed to the cam guide 611 and the annular member 641 of the leg portion 681 move upward. As a result, the outlet 162 is opened and the water flow in the flow path 134 is released.

Further, in the case that the mode is switched from the second purification mode to the first washing mode, the protruding portion 622a in contact with the ceiling of the inner surface of the cam guide 612 as shown in FIG. 9(B) becomes disconnected from the ceiling of the inner surface of the cam guide 612 as shown in FIG. 10(B). As a result, the cam guide 612 moves toward the lower side from the upper side. As mentioned above, since the cam guide 612 serving as the driven element moves downward, the leg portion 682 fixed to the cam guide 612 and the annular member 642 of the leg portion 682 move downward. As a result, the outlet 163 is closed and the water flow in the flow path 135 is blocked.

In the same manner, in the case that the mode is switched from the second purification mode to the first washing mode, the rotating shaft 10 and the protruding portion 72 shown in FIG. 9(C) rotate by about 90 degrees, and the protruding portion 72 is arranged at a position at which the protruding portion 72 comes into contact with the ceiling of the inner surface of the cam guide 71 as shown in FIG. 10(C). Further, in this case, the cam guide 71, the leg portion 78 and the annular member 74 move upward. As a result, the outlet 172 is opened, and the water flow in the flow path 137 is released. In the case that the mode is switched from the second purification mode to the first washing mode, the rotating shaft 10 and the protruding portion 82 shown in FIG. 9(D) rotate by about 90 degrees. As shown in FIG. 9(D) and FIG. 10(D), even in the case that the mode is switched from the second purification mode to the first washing mode, the outlet 182 is still closed.

Further, in the same manner, when the mode is switched from the second purification mode to the first washing mode, the protruding portion 92a in contact with the ceiling of the inner surface of the cam guide 91 as shown in FIG. 9(E) is disconnected from the ceiling of the inner surface of the cam guide 91 as shown in FIG. 10(E). During this time, the cam guide 91, the leg portion 98 and the annular member 94 move downward. As a result, the outlet 192 is closed, and the water flow in the flow path 132 is blocked.

FIG. 11 is a view schematically showing operative, or working states, of the valve mechanisms 60, 70, 80 and 90 in the case that the water flows through the first channel and the mode of the water purifier 100 is the first purification mode. Further, FIG. 12 is a view schematically showing operative, or working states, of the valve mechanisms 60, 70, 80 and 90 in the case that the water purifier 100 washes the filter medium 53 of the filter tank 5 (in the case that the water flows through the third channel, and the mode of the water purifier 100 is the second washing mode). The operation, or working of the valve mechanisms 60, 70, 80 and 90 when the state changes from the state shown in FIG. 10 to the state shown in FIG. 11, the operation of the valve mechanism 60, 70, 80 and 90 when the state changes from the state shown in FIG. 11 to the state shown in FIG. 12, and the operation of the valve mechanisms 60, 70, 80 and 90 when the state changes from the state shown in FIG. 12 to the state shown in FIG. 9 are the same as those mentioned in connection with FIGS. 9 and 10 in which the valve mechanisms work in conjunction the rotation of the rotating shaft 10. For that reason, a description will be omitted of the operation of the valve mechanisms 60, 70 and 80 in the case that the state changes from the state shown in FIG. 10 to the state shown in FIG. 11, the operation of the valve mechanisms 60, 70 and 80 in the case that the state changes from the state shown in FIG. 11 to the state shown in FIG. 12, and the operation of the valve mechanisms 60, 70 and 80 in the case that the state changes from the state shown in FIG. 12 to the state shown in FIG. 9, and a description will be given only of the operation of the valve mechanism 90. As is known by referring to FIGS. 9 to 12, the positions of the protruding portions 621a, 621b, 621c, 622a, 622b, 622c, 72, 82, 92a and 92b are different according to the modes.

As shown in FIG. 11(E), in the case that the water flows through the first channel, and the mode of the water purifier 100 is the first purification mode, the valve mechanism 90 is in a state in which the annular member 94 of the leg portion 98 opens the outlet 192. When the mode is switched from the first washing mode to the first purification mode, the rotating shaft 10 and the protruding portions 92a and 92b shown in FIG. 10(E) rotate by about 90 degrees inside of the cam guide 91, and the protruding portion 92b is placed at a position at which the protruding portion 92b comes into contact with the ceiling of the inner surface of the cam guide 91 as shown in FIG. 11(E). Further, when the mode of the water purifier 100 is switched from the first washing mode to the first purification mode, the cam guide 91, the leg portion 98 and the annular member 94 move upward. As a result, the outlet 192 is opened, and the water flow in the flow path 132 is released.

As shown in FIG. 11(A), in the case that the mode of the water purifier 100 is the first purification mode, the annular member 641 opens the outlet 162. Further, as shown in FIGS. 11(B) to 11(E), in the case that the mode of the water purifier 100 is the first purification mode, the annular member 642 opens the outlet 163, the annular member 74 closes the outlet 172, the annular member 84 closes the outlet 182, and the annular member 94 opens the outlet 192. As mentioned above, in the case that the mode of the water purifier 100 is the first purification mode, the valve mechanism 60 opens between the flow path 133 (refer to FIG. 5) and the flow path 134, and opens between the flow path 133 and the flow path 135. Further, in this case, the valve mechanism 70 closes the flow path 137, the valve mechanism 80 closes the flow path 142, and the valve mechanism 90 opens the flow path 132.

As shown in FIG. 12(E), in the case that the water flows through the third channel, and the mode of the water purifier 100 is the second washing mode, the valve mechanism 90 is in a state in which the annular member 94 of the leg portion 98 closes the outlet 192. When the mode is switched from the first purification mode to the second washing mode, the protruding portion 92b in contact with the ceiling of the inner surface of the cam guide 91 as shown in FIG. 11(E) is disconnected from the ceiling of the inner surface of the cam guide 91 as shown in FIG. 12(E). As a result, the cam guide 91 moves from the upper side toward the lower side. As mentioned above, since the cam guide 91 serving as the driven element moves downward, the leg portion 98 fixed to the cam guide 91, and the annular member 94 of the leg portion 98 move downward. As a result, the outlet 192 is closed and the water flow in the flow path 132 is blocked.

As shown in FIG. 12(A), in the case that the mode of the water purifier 100 is the second washing mode, the annular member 641 closes the outlet 162. Further, as shown in FIGS. 12(B) to 12(E), in the case that the mode of the water purifier 100 is the second washing mode, the annular member 642 opens the outlet 163, the annular member 74 closes the outlet 172, the annular member 84 opens the outlet 182, and the annular member 94 closes the outlet 192. As mentioned above, in the case that the mode of the water purifier 100 is the second washing mode, the valve mechanism 60 closes between the flow path 133 (refer to FIG. 5) and the flow path 134, and opens between the flow path 133 and the flow path 135. Further, in the case that the mode of the water purifier 100 is the second washing mode, the valve mechanism 70 closes the flow path 137, the valve mechanism 80 opens the flow path 142 and the valve mechanism 90 closes the flow path 132.

As mentioned above, the water purifier 100 is provided with the filter tank 4, the filter tank 5, the flow system 130, the valve mechanisms 60, 70, 80 and 90, and the switching lever 6. The filter tank 4 and the filter tank 5 filtrate the water. The flow system 130 at least has the first channel, the second channel and the third channel. The first channel is the channel in which the water is filtrated in the filter tank 4 and the filter tank 5. The second channel is the channel in which the water is filtrated in the filter tank 5 and the filter tank 4 is washed. The third channel is the channel in which the water is filtrated in the filter tank 4 and the filter tank 5 is washed. The valve mechanisms 60, 70, 80 and 90 are opened and closed so as to switch among the first channel, the second channel and the third channel in the flow system 130. The switching lever 6 is operated by the user of the water purifier 100. Further, the switching lever 6 actuates the valve mechanisms 60, 70, 80 and 90 to perform switching among the first channel, the second channel and the third channel in the flow system 130 such that the channels are selected in the order of the first channel, the second channel, the first channel, the third channel and the first channel. The valve mechanisms 60, 70, 80 and 90 work in conjunction with the operation of the switching lever 6.

According to the water purifier 100, the first channel is a channel to be used at the time of producing the purified water. The second channel is a channel to be used at the time of washing the filter medium 43, and the third channel is a channel to be used at the time of washing the filter medium 53. The valve mechanisms 60, 70, 80 and 90 release and block the water flow in the flow system 130, whereby switching among the first channel, the second channel and the third channel is performed. Further, the valve mechanisms 60, 70, 80 and 90 work in conjunction with the operation of the switching lever 6. The switching lever 6 is manipulated by the user. In other words, the opening and closing operation of the valve mechanisms 60, 70, 80 and 90 is carried out by the user. As mentioned above, in the water purifier 100, electromagnetic valves are not used. Further, no controller for controlling such electromagnetic valves is necessary. Accordingly, it is possible to hold down a cost required for the water purifier 100. Further, it is possible to downsize the water purifier 100.

Therefore, according to the present embodiment, it is possible to provide a water purifier 100 which is configured so as to simultaneously perform the opening and closing operations of a plurality of valves for switching between the channel to be used at the time of producing the purified water and the channel to be used at the time of washing the filter medium and which is comparatively inexpensive and can be downsized. Further, in the case that the water purifier 100 does not use any electricity, it is possible to achieve a water purifier which is not affected by an electric power supply specification.

In the water purifier 100, the first channel is a channel in which the water is filtrated in both the filter tank 4 and the filter tank 5. According to this arrangement, it is possible to increase a flow rate of the flow system 130 at the time of producing the purified water because both of the filter tank 4 and the filter tank 5 are used for filtrating the water. In other words, even in the case that volumetric capacities of each of the filter tank 4 and the filter tank 5 are comparatively small, it is possible to filtrate a sufficient amount of water.

Further, according to this arrangement, advantageously, the water purifier will not be left in a state in which the liquid stays in one filter tank without flowing there while the liquid flows in the other filter tank. If a filter tank is left, for a comparatively long time, in a state that the liquid stays in the filter tank, there is a risk that funguses and bacteria breed in the filter tank. However, according to the arrangement of the embodiment, since the water flows through both of the filter tank 4 and the filter tank 5 when the purified water is produced, both the filter tank 4 and the filter tank 5 are prevented from being left in the state in which the water stays therein without circulating. Therefore, it is possible to inhibit the fungus from breeding.

In the water purifier 100, the valve mechanism 60, the valve mechanism 70, the valve mechanism 80 and the valve mechanism 90 are brought together in one place.

According to this configuration, because the valve mechanism 60, the valve mechanism 70, the valve mechanism 80 and the valve mechanism 90 are arranged so as to be brought together in one place, it is possible to make a volume occupied by the valve mechanism 60, the valve mechanism 70, the valve mechanism 80 and the valve mechanism 90 small. Further, it is possible to simplify connections among the switching lever 6, the rotating shaft 10 and the valve mechanisms 60, 70, 80 and 90. Therefore, it is further possible to downsize the water purifier 100.

In the water purifier 100, the switching portion is constructed at least by the switching lever 6 and the rotating shaft 10. The switching lever 6 is operated by the user of the water purifier 100. The rotating shaft 10 rotates together with the switching lever 6. The valve mechanism 60 has the inlet 161 through which the water flows into the valve mechanism 60 from the flow path 133, the outlet 162 through which the water flows out of the valve mechanism 60 to the flow path 134, and the outlet 163 through which the water flows out of the valve mechanism 60 to the flow path 135. The valve mechanism 70 has the inlet 171 through which the water flows into the valve mechanism 70 from the flow path 136, and the outlet 172 through which the water flows out of the valve mechanism 70 to the flow path 137. The valve mechanism 80 has the inlet 181 through which the water flows into the valve mechanism 80 from the flow path 141, and the outlet 182 through which the water flows out of the valve mechanism 80 to the flow path 142. The valve mechanism 90 has the inlet 191 through which the water flows into the valve mechanism 90 from the flow path 139, and the outlet 192 through which the water flows out of the valve mechanism 90 to the flow path 132.

For example, the valve mechanism has the cam 77 that is fixed to the rotating shaft 10, the cam guide 71 that surrounds a part of the rotating shaft 10 and a part of the cam 77, the leg portion 78 that is fixed to the cam guide 71 and opens and closes the outlet 172, and the annular member 74 that is attached to the leg portion 78. Further, for example, in the valve mechanism 70, the cam guide 71 and the leg portion 78 move in conjunction with the rotation of the rotating shaft 10 and the cam 77 upon the operation of the switching lever 6, so that the annular member 74 of the leg portion 78 opens and closes the outlet 172.

According to the water purifier 100, the rotating shaft 10 and the cams 67, 77, 87 and 97 are fixed to each other. The leg portions 681, 682, 78, 88 and 98 are respectively fixed to the cam guides 611, 612, 71, 81 and 91. When the switching lever 6 is operated by the user, the rotating shaft 10 and the cams 67, 77, 87 and 97 rotate together with the switching lever 6. Further, when the cam guide 611, 612, 71, 81 and 91, and the leg portions 681, 682, 78, 88 and 98 move from the lower side toward the upper side with the rotation of the rotating shaft 10 and the cams 67, 77, 87 and 97, the annular members 641, 642, 74, 84 and 94 respectively open the outlets 162, 163, 172, 182 and 192. Thus, in the water purifier 100, electromagnetic valves are not used, and the cams 67, 77, 87 and 97 are operated by the operation, or manipulation, of the switching lever 6 by the user. Then, the valve mechanisms 60, 70, 80 and 90 are operated by the operation of the cams 67, 77, 87 and 97. Therefore, it is possible to hold down the costs required for the water purifier 100, and it is also possible to downsize the water purifier 100.

The water purifier 100 may be provided with a two-way valve which is arranged in the flow path 134, and a two-way valve which is arranged in the flow path 135, in place of the valve mechanism 60 which serves as a three-way valve.

In the water purifier 100, the angle by which the switching lever 6 and the rotating shaft 10 rotate is not limited to about 90 degrees. Also, the water purifier 100 is not limited to the configuration in which the four modes are switched from one to another by the uniform interval rotation of the switching lever 6 and the rotating shaft 10. The angle by which the switching lever 6 and the rotating shaft 10 rotate may be appropriately determined in correspondence to the shapes of the cam guides 611, 612, 71, 81 and 91, and the shapes of the cams 67, 77, 87 and 97. Further, the rotating shaft 10 has a constant cross sectional area as shown in FIG. 5, however, may have a non-constant cross sectional area.

In the water purifier 100, the valve mechanisms 60, 70, 80 and 90 are structured such as to respectively close the outlets 162 and 163, 172, 182 and 192. However, the valve mechanism 70, the valve mechanism 80 and the valve mechanism 90 may be structured such as to respectively close the inlet 171, the inlet 181 and the inlet 191. For example, in the valve mechanism 70, it is possible to allow the annular member 74 attached to the leg portion 78 to close the inlet 171 by controlling the direction in which the spring 73 applies bias or force and the position of the leg portion 78 in relation to the cam guide 71.

Further, in the water purifier 100, the shape of the switching lever 6 is not limited to any particular one. The switching lever 6 can employ any structure as long as the switching lever 6 can at least rotate the rotating shaft 10 by a predetermined angle of rotation so that the modes in the water purifier 100 are changed in a cyclic manner in the order of the first washing mode, the first purification mode, the second washing mode, the second purification mode and the first washing mode. Further, the direction in which the switching lever 6 rotates is not limited to the counterclockwise direction, but the switching lever 6 may rotate in a clockwise direction. The position of the protruding portion on each of the cams 67, 77, 87 and 97 may be appropriately set such that switching among the first washing mode, the first purification mode, the second washing mode and the second purification mode is performed with the clockwise rotation of the switching lever 6.

In the water purifier 100, the valve mechanisms 60, 70, 80 and 90 are not limited to the ones that are configured and arranged so as to be actuated upon the transmission of the rotation of the switching lever 6 to the rotating shaft 10. The valve mechanism 60, the valve mechanism 70, the valve mechanism 80 and the valve mechanism 90 may employ other features as long as such valve mechanisms work with the switching lever 6 which is operated by the user of the water purifier 100. Further, the switching lever 6 and the rotating shaft 10 may be structured such that the rotating direction is restricted to one direction under a control of a control portion (not shown).

Since the rotating direction of the switching lever 6 and the rotating shaft 10 are restricted to one direction as mentioned above, it is possible to prevent the user from washing only the same filter medium. Further, since the water purifier 100 is structured such that the user is not aware of the difference between the first washing mode and the second washing mode, it is possible to lighten the load of the user. For example, as long as the tubular members constructing the flow system 130 are not transparent, the user cannot see the water flow in the flow system 130. Further, as mentioned above, most of the flow system 130 except a part of the flow path 131 and a part of the flow path 132 is accommodated in the case 110. Therefore, when the user views the water purifier 100 from outside of the case 110 in the first washing mode and the second washing mode, the user can only see water flowing into the water purifier 100 via the flow path 131 and being discharged from the water purifier 100 in the same manner in both modes.

On the other hand, when the water purifier 100 is in the first purification mode as well as when in the second purification mode, the water flows through the same channel in the flow system 130 of the water purifier 100 in both purification modes even if the angles of rotation in relation to the predetermined origin position of the rotating shaft 10 are different between the first and the second purification modes. As mentioned above, the water purifier 100 is structured such that the user is not aware of the difference between the first purification mode and the second purification mode.

As mentioned above, the water purifier 100 is structured such that the user is not aware of the difference between the first purification mode and the second purification mode and the difference between the first washing mode and the second washing mode. Therefore, it is possible to make the user recognize the first purification mode and the second purification mode simply as a purified water mode, and recognize the first washing mode and the second washing mode simply as a washing mode. Even though the user recognizes the modes simply as the washing mode or the purification mode, the first washing mode and the second washing mode are certainly and alternately selected between the purification modes since the rotating direction of the rotating shaft 10 is limited to one direction. Therefore, it is possible to avoid a situation in which the user happens wash only one of the filter medium 43 and the filter medium 53. For example, in the case that the user switches the mode of the water purifier 100 from the purification mode to the washing mode at a rate of once a week, it is possible to wash each of the filter medium 43 and the filter medium 53 once two weeks by the first washing mode and the second washing mode.

Second Embodiment

In the water purifier 100 according to the first embodiment, the first channel is the channel through which the water is filtrated in both the filter tank 4 and the filter tank 5. However, the first channel may be a channel through which the water is filtrated in either the filter tank 4 or the filter tank 5.

In a water purifier according to a second embodiment, the first channel has a fourth channel through which the water is filtrated in the filter tank 4, and a fifth channel through which the water is filtrated in the filter tank 5. The switching lever 6 actuates the valve mechanisms 60, 70, 80 and 90 so that the switching among the second channel, the third channel, the fourth channel and the fifth channel in the flow system 130 is performed in a cyclic manner in the order of the fourth channel, the second channel, the fifth channel, the third channel and the fourth channel. A description will be given below of the operation of the valve mechanisms 60, 70, 80 and 90 when the second channel, the third channel, the fourth channel and the fifth channel are switched from one to another, and structures of the valve mechanisms 60, 70, 80 and 90 in the water purifier according to the second embodiment. In the following description, the water purifier according to the second embodiment is called simply as the water purifier.

FIG. 13 is a view schematically showing states of operation of the valve mechanisms 60, 70, 80 and 90 in the case that the mode of the water purifier is the second purification mode (that is, the case that the water flows through the fourth channel and the water is filtrated in the filter tank 4). On the other hand, FIG. 14 is a view schematically showing states of operation of the valve mechanisms 60, 70, 80 and 90 in the case that the mode of the water purifier is the first washing mode (that is, the case that the water flows through the second channel and the filter medium 43 of the filter tank 4 is washed or cleaned). FIG. 15 is a view schematically showing states of operation of the valve mechanism 60, 70, 80 and 90 in the case that the mode of the water purifier is the first purification mode (that is, the case that the water flows through the fifth channel and the water is filtrated in the filter tank 5). FIG. 16 is a view schematically showing states of operation of the valve mechanisms 60, 70, 80 and 90 in the case that the mode of the water purifier is the second washing mode (that is, the case that the water flows through the third channel in the case that the filter medium 53 of the filter tank 5 is washed).

In the water purifier, since the structures of the valve mechanisms 70, 80 and 90 are the same as those of the water purifier 100, a description of the structures and the operation of the valve mechanisms 70, 80 and 90 will be omitted, and only the structure and the operation of the valve mechanism 60 will be described below.

As is known by referring to FIGS. 13 to 16 and FIGS. 9 to 12, the valve mechanism 60 of the water purifier does not have the protruding portion 621*c* and the protruding portion 622*c*. As shown in FIG. 13(A), in the case that the mode of the water purifier is the second purification mode and the water flows through the fourth channel, the valve mechanism 60 is in a state in which the annular member 641 of the leg portion 681 closes the outlet 162. In this state, the protruding portion 621*a* or the protruding portion 621*b* does not lift the cam guide 611 upward. On the other hand, as shown in FIG. 13(B), in the same case that the mode of the water purifier is the second purification mode and the water flows through the fourth channel, the valve mechanism 60 is in a state in which the annular member 642 of the leg portion 682 opens the outlet 163. In this state, the cam guide 612 is lifted upward by the protruding portion 622*a*.

In the case that the mode is switched from the second purification mode to the first washing mode, the rotating shaft 10 and the protruding portions 621*a* and 621*b* shown in FIG. 13(A) rotate by about 90 degrees, and the protruding portion 621*b* is placed at a position at which the protruding portion 621*b* is in contact with the ceiling of the inner surface of the cam guide 611 as shown in FIG. 14(A). In this case, the cam guide 611, the leg portion 681 and the annular member 641 move upward. Further, in the case that the mode is switched from the second purification mode to the first washing mode, the rotating shaft 10 and the protruding portions 622a and 622b shown in FIG. 13(B) rotate by about 90 degrees, and the protruding portion 622a in contact with the ceiling of the inner surface of the cam guide 612 is disconnected therefrom as shown in FIG. 14(B). In this case, the cam guide 612, the leg portion 682 and the annular member 642 move downward.

Subsequently, in the case that the mode is switched from the first washing mode to the first purification mode, the rotating shaft 10 and the protruding portions 621a and 621b shown in FIG. 14(A) rotate by about 90 degrees, and the protruding portion 621a is placed at a position at which the protruding portion 621a comes into contact with the ceiling of the inner surface of the cam guide 611 as shown in FIG. 15(A). In this case, a state in which the cam guide 611, the leg portion 681 and the annular member 641 are lifted upward is maintained. Further, in the case that the mode is switched from the first washing mode to the first purification mode, the rotating shaft 10 and the protruding portions 622a and 622b shown in FIG. 14(B) rotate by about 90 degrees. In this case, a state in which the annular member 642 closes the outlet 163 is maintained as shown in FIGS. 14(B) and 15(B).

Further, in the case that the mode is switched from the first purification mode to the second washing mode, the rotating shaft 10 and the protruding portions 621a and 621b shown in FIG. 15(A) rotate by about 90 degrees, and the protruding portion 621a in contact with the ceiling of the inner surface of the cam guide 611 is disconnected therefrom as shown in FIG. 16(A). Further, in the case that the mode is switched from the first purification mode to the second washing mode, the rotating shaft 10 and the protruding portions 622a and 622b shown in FIG. 15(B) rotate by about 90 degrees, and the protruding portion 622b is placed at a position at which the protruding portion 622b comes into contact with the ceiling of the inner surface of the cam guide 612 as shown in FIG. 16(B). In this case, the cam guide 612, the leg portion 682 and the annular member 642 move upward.

As mentioned above, according to the structure of the water purifier, the operational state is switched from, for example, a state in which the purified water is produced by filtrating the water in the filter tank 4 (that is, the second purification mode) to a state in which the filter tank 4 is cleaned by using the filter tank 5 (that is, the first washing mode). As mentioned above, in the case that the necessity of washing the inner potion of the filter tank 4 of the water purifier arises due to the progress of dirt in the inner portion of the filter tank 4, the filter tank 4 is washed by switching the mode to the next mode. After washing the filter tank 4, the state is switched to a state in which the purified water is produced by filtrating the water in the filter tank 5 (that is, the first purification mode). Subsequently, in the case that the necessity of washing the inner portion of the filter tank 5 of the water purifier arises due to the progress of dirt in the inner portion of the filter tank 5, the state is switched to a state in which the filter tank 5 is washed by using the filter tank 4 (that is, the second washing mode). At this time, that is, when the filter tank 5 is washed, the once washed filter tank 4 can be used. Then, after washing the filter tank 5, the state is switched to a state in which the water is filtrated by the washed, comparatively clean filter tank 4 (that is, the second purification mode). As mentioned above, according to the structure, it is possible to wash dirty one filter tank by using the water filtrated by the other filter tank which has been washed and is comparatively clean.

Since the other features of the water purifier according to the second embodiment are the same as those of the water purifier 100 according to the first embodiment, a description of the other features will be omitted.

It should be understood that the embodiments disclosed above are provided only for exemplification in all the points, and are not intended to limit the present invention. The scope of the present invention should be determined by the attached claims only, and not by the above embodiments, and all the modifications and changes within meaning and range which are equivalent to the claims are intended to be included in the scope of the following claims.

INDUSTRIAL APPLICABILITY

According to the present invention, it is possible to provide a water purifier of which a plurality of valves for switching a channel intended for production of purified water and a channel intended for cleaning of a filter can be simultaneously operated to be opened or closed, the water purifier being relatively inexpensive and allowing size reduction thereof. Therefore, the present invention is useful with regard to water purifiers having a filter medium washing function.

REFERENCE SIGNS LIST

4: filter tank, 5: filter tank, 6: switching lever, 10: rotating shaft, 60: valve mechanism, 70: valve mechanism, 80: valve mechanism, 90: valve mechanism, 100: water purifier, 130: flow system, 161: inlet, 162, 163: outlet, 611, 612: cam guide, 641, 642: annular member, 67: cam, and 681, 682: leg portion.

What is claimed is:

1. A water purifier, comprising:
a first filter tank and a second filter tank for filtrating liquid;
a flow system including, at least, a first channel in which the liquid is filtrated in at least one of the first filter tank and the second filter tank, a second channel in which the liquid is filtrated in the second filter tank and the first filter tank is washed, and a third channel in which the liquid is filtrated in the first filter tank and the second filter tank is washed;
a plurality of valve mechanisms configured to be opened and closed so as to perform switching among the first, second, and third channels; and
a switching portion including an operating portion configured to be operated by a user of the water purifier and a rotating shaft rotatable together with the operating portion to actuate the plurality of valve mechanisms to perform the switching among the first, second, and third channels such that the channels are selected cyclically in order of the first channel, the second channel, the first channel, the third channel and the first channel,
each of the valve mechanisms working in junction with the operation of the switching portion;
wherein the plurality of valve mechanisms are positioned within a single case;
wherein each of the valve mechanisms includes an inlet through which liquid flows from the flow system into the valve mechanism, an outlet through which the liquid flows out of the valve mechanism into the flow system, a cam fixed to the rotating shaft, a cam guide surrounding a part of the rotating shaft and a part of the cam, and a blocking portion fixed to the cam guide and configured to open or close the inlet or the outlet, and wherein operation of the operating portion allows the cam guide and the blocking portion to move in conjunction with rotation of the rotating shaft and the cam, and the movement of the cam guide and the blocking portion allows the blocking portion to open or close the inlet or the outlet.

2. The water purifier as set forth in claim 1, wherein the first channel is a channel in which the liquid is filtrated in both the first filter tank and the second filter tank.

3. The water purifier as set forth in claim 1, wherein the first channel is a channel in which the liquid is filtrated in either the first filter tank or the second filter tank, the first channel including a fourth channel in which the liquid is filtrated in the first filter tank and a fifth channel in which the liquid is filtrated in the second filter tank, and wherein the switching portion is configured to actuate the plurality of valve mechanisms to perform the switching among the second, third, fourth and fifth channels of the flow system such that the channels are selected cyclically in order of the fourth channel, the second channel, the fifth channel, the third channel and the fourth channel.

4. A water purifier, comprising:

a first filter tank and a second filter tank for filtrating liquid;

a flow system including, at least, a first channel in which the liquid is filtrated in at least one of the first filter tank and the second filter tank, a second channel in which the liquid is filtrated in the second filter tank and the first filter tank is washed, and a third channel in which the liquid is filtrated in the first filter tank and the second filter tank is washed;

a plurality of valve mechanisms configured to be opened and closed so as to perform switching among the first, second, and third channels;

the water purifier having a purification mode in which the liquid flows through the first channel in the flow system, a first washing mode in which the liquid flows through the second channel in the flow system, and a second washing mode in which the liquid flows through the third channel in the flow system, and a switching portion including an operating portion configured to be operated by a user of the water purifier and a rotating shaft rotatable together with the operating portion to mechanically actuate the plurality of valve mechanisms to perform switching among the purification mode, the first washing mode, and the second washing mode such that the modes are selected cyclically in order of the purification mode, the first washing mode, the purification mode, the second washing mode, and the purification mode, each of the valve mechanisms working in junction with the operation of the switching portion;

wherein the plurality of valve mechanisms are positioned within a single case;

wherein each of the valve mechanisms includes an inlet through which liquid flows from the flow system into the valve mechanism, an outlet through which the liquid flows out of the valve mechanism into the flow system, a cam fixed to the rotating shaft, a cam guide surrounding a part of the rotating shaft and a part of the cam, and a blocking portion fixed to the cam guide and configured to open or close the inlet or the outlet, and wherein operation of the operating portion allows the cam guide and the blocking portion to move in conjunction with rotation of the rotating shaft and the cam, and the movement of the cam guide and the blocking portion allows the blocking portion to open or close the inlet or the outlet.

5. The water purifier as set forth in claim 4, wherein the switching portion is configured to be operable in only one direction.

6. The water purifier as set forth in claim 4, wherein the first channel is a channel in which the liquid is filtrated in both the first filter tank and the second filter tank.

7. The water purifier as set forth in claim 1, wherein the operating portion comprises a lever configured to be rotated at predefined intervals by a user of the water purifier and the rotating shaft is configured to rotate together with the lever such that each rotation of the lever by the predefined interval actuates the plurality of valve mechanisms.

8. A water purifier, comprising:

a filter tank and a second filter tank for filtrating liquid;

a first channel in which the liquid is filtrated in the first filter tank;

a second channel in which the liquid is filtrated in the second filter tank and the first filter tank is washed;

a plurality of valve mechanisms configured to be opened and closed so as to perform switching between the first and second channels; and a switching portion configured to be operated by a user of the water purifier so as to actuate the plurality of valve mechanisms to perform the switching between the first and second channels, each of the valve mechanisms working in junction with the operation of the switching portion, wherein the switching portion includes an operating portion configured to be operated by the user of the water purifier and a rotating shaft rotatable together with the operating portion, wherein each of the valve mechanisms includes:

an inlet through which liquid flows into the valve mechanism;

an outlet through which the liquid flows out of the valve mechanism;

a cam fixed to the rotating shaft;

a cam guide surrounding a part of the rotating shaft and a part of the cam; and a blocking portion fixed to the cam guide and configured to open or close the inlet or the outlet, and wherein operation of the operating portion allows the cam guide and the blocking portion to move in conjunction with rotation of the rotating shaft and the cam, and the movement of the cam guide and the blocking portion allows the blocking portion to open or close the inlet or the outlet.

* * * * *